(12) United States Patent
Fujita

(10) Patent No.: US 7,058,845 B2
(45) Date of Patent: Jun. 6, 2006

(54) COMMUNICATION CONNECTION BYPASS METHOD CAPABLE OF MINIMIZING TRAFFIC LOSS WHEN FAILURE OCCURS

(75) Inventor: Norihito Fujita, Tokyo (JP)

(73) Assignee: Nec Corporation, Tokyo (JP)

( * ) Notice: Subject to any disclaimer, the term of this patent is extended or adjusted under 35 U.S.C. 154(b) by 656 days.

(21) Appl. No.: 10/193,217

(22) Filed: Jul. 12, 2002

(65) Prior Publication Data

US 2003/0028818 A1    Feb. 6, 2003

(30) Foreign Application Priority Data

Jul. 12, 2001    (JP)    ............................. 2001-211561

(51) Int. Cl.
*G06F 11/00*    (2006.01)

(52) U.S. Cl. ..................... 714/4; 370/221; 370/225; 370/228

(58) Field of Classification Search .................... 714/4; 370/225, 221, 228, 351, 411
See application file for complete search history.

(56) References Cited

U.S. PATENT DOCUMENTS

| | | | | |
|---|---|---|---|---|
| 6,141,319 A | * | 10/2000 | Dighe et al. | 370/218 |
| 6,147,966 A | * | 11/2000 | Johnson et al. | 370/221 |
| 6,359,857 B1 | * | 3/2002 | Ahmad et al. | 370/217 |
| 6,847,607 B1 | * | 1/2005 | Kasdan | 370/225 |
| 2002/0067693 A1 | * | 6/2002 | Kodialam et al. | 370/216 |
| 2002/0181393 A1 | * | 12/2002 | Grover et al. | 370/225 |
| 2002/0186654 A1 | * | 12/2002 | Tornar | 370/225 |
| 2003/0137933 A1 | * | 7/2003 | Yamada et al. | 370/225 |

FOREIGN PATENT DOCUMENTS

| | | |
|---|---|---|
| JP | H10-145362 A | 5/1998 |
| JP | H10-190686 A | 7/1998 |
| JP | 2000-22699 A | 1/2000 |
| JP | 2001-156800 A | 6/2001 |

OTHER PUBLICATIONS

The Grammar Outlaw: The Misplaced Modifier, AKA The Sentence Dangler, Date Unknown, http://ace.acadiau.ca/english/grammar/mmodifier.htm.*
Gan et al., "Draft-gan-fast-reroute-00.txt", Internet Draft, Apr. 10, 2001, pp. 1-6.

* cited by examiner

*Primary Examiner*—Robert Beausoliel
*Assistant Examiner*—Marc Duncan
(74) *Attorney, Agent, or Firm*—Sughrue Mion, PLLC

(57) ABSTRACT

Backup LSPs (label switched path) are established from LSRs (label switching router) except the egress LSR of a main LSP. Each backup LSP is established between an LSR that functions as a starting node and the egress LSR so as not to include any link or node on the main LSP to be protected. When the backup LSP is established such that it merges into another pre-established backup LSP protecting the same main LSP, merging is performed at the LSR located at the merge point.

28 Claims, 21 Drawing Sheets

LSP DATABASE

| LSP-ID | MAIN/BACKUP | INPUT LABEL | OUTPUT LABEL / INTERFACE | RESERVED BANDWIDTH |
|---|---|---|---|---|
| LSP1 | MAIN | aaa | bbb/port1 | 1Mbps |
| LSP1 | BACKUP | --- | ccc/port2 | 1Mbps |
| LSP2 | BACKUP | ddd | eee/port2 | 5Mbps |
| LSP2 | BACKUP | fff | --- | --- |
| .. | .. | .. | .. | .. |

LSP DATABASE

| GROUP | LSP-ID | MAIN/BACKUP | INPUT LABEL | OUTPUT LABEL / INTERFACE | RESERVED BANDWIDTH |
|---|---|---|---|---|---|
| GA | LSP1 | MAIN | aaa | bbb/port1 | 2Mbps |
|  | LSP1 | BACKUP | --- | ccc/port2 | 1Mbps |
|  | LSP2 | BACKUP | ddd | --- | --- |
|  | .. | .. | .. | .. | .. |
| GB | LSP3 | BACKUP | eee | fff/port1 | 5Mbps |
|  | LSP4 | BACKUP | ggg | --- | --- |
|  | .. | .. | .. | .. | .. |
| .. | .. | .. | .. | .. | .. |

A15

COMMUNICATION CONNECTION BYPASS METHOD CAPABLE OF MINIMIZING TRAFFIC LOSS WHEN FAILURE OCCURS

BACKGROUND OF THE INVENTION

1. Field of the Invention

The present invention generally relates to a communication connection bypass method and to nodes and servers both of which implement the method. More particularly, the present invention relates to an improvement in minimizing loss of traffic flowing through a communication connection established in a connection-oriented network, in case of a node or link failure on the communication connection.

2. Description of the Related Art

Conventionally, such a communication connection bypass system has been used for the following purpose. In case of a node or link failure on a communication connection (main communication connection) in a connection-oriented network, a need exists for minimizing loss of the traffic flowing through the failed communication connection. This is implemented by switching a data transfer route to a pre-established backup communication connection that bypasses the failed node or link.

One example of known communication connection bypass systems is disclosed in Internet Draft, draft-gan-fast-reroute-00.txt, April 2001. In this document, a method for establishing backup label switched paths (hereinafter referred to as "LSPs") in a multi-protocol label switching network (hereinafter referred to as a "MPLS network") is proposed. The term "backup LSP" refers to an LSP that is switched from an LSP (main LSP) to bypass a failure in case of a link or node failure on the main LSP.

FIG. 1 is a schematic diagram to illustrate a method for establishing backup LSPs proposed in the document. In FIG. 1, label switching routers (hereinafter referred to as "LSRs") 101 to 108 are provided in a network. The LSR 101 to 108 are interconnected by links 201 to 211.

In FIG. 1, a main LSP 301 is established with the LSR 101 being the ingress LSR and the LSR 105 being the egress LSR. In this case, as backup LSPs, backup LSPs 302 to 305 are established. That is, the backup LSPs 302 to 305 are respectively established such that the LSRs 101 to 104, which are on the main LSP 301, function as the starting points, namely, the starting nodes. Each backup LSP is also established to be directed to an LSR that is two hops or more away downstream from a starting node LSR, so as to bypass an adjacent downstream link or node. When, however, the LSR 104 is the starting node, the backup LSP 305 is established so as to bypass the adjacent downstream link 204 since the LSR one hop away downstream from the LSR 104 is the egress LSR. Each backup LSP bypasses a failure at a downstream link or node, which is on the backup LSP, adjacent to an LSR that serves as the starting node for the backup LSP. The backup LSPs 302, 303, 304, and 305 merge into the main LSP 301 at the LSRs 103, 104, 105, and 105, respectively. For example, traffic flowing on the backup LSP 302 merges into the main LSP 301 at the LSR 103.

Thus, pre-establishing the backup LSPs 302 to 305 in this manner eliminates the need for reestablishing an LSP for bypassing a failed link or node in case of a failure. In addition, even when any link or node between the LSRs 101 and 105 on the main LSP 301 has failed, an upstream LSR adjacent to the failed link or node can detect the failure and switch over to a backup LSP originating from the LSR that has detected the failure.

That is, when an LSR on the main LSP detects a failure of an adjacent downstream link or node, the LSR immediately switches from the main LSP to a backup LSP originating from the LSR that has detected the failure, without notifying other nodes of the failure. This can achieve failure recovery.

However, the communication connection bypass system described above has some disadvantages.

The first disadvantage is as follows. Since a backup communication connection is set up independently from each node on a main communication connection, the backup communication connection consumes a large amount of link resources. This is because a backup communication connection must be established to be node-disjoint from the segment on the main communication connection to be protected by the backup communication connection. Thus, the amount of link resources consumed per backup communication connection tends to be large. Additionally, since the backup communication connection is set up from each node except the egress node of the main communication connection, the number of backup communication connections increases in proportion to the number of hops on the main communication connection. For example, in FIG. 1, the main LSP 301 consumes link resources corresponding to four links. In contrast, the backup LSPs 302 to 305 consume link resources corresponding to 12 links in total.

The second disadvantage is as follows. When a plurality of main communication connections are set up between two given nodes in a network to provide traffic load balancing, the setup of backup communication connections for each main communication connection for load balancing results in the backup communication connections consuming a large amount of link resources. This is because the backup communication connections are set up independently from the main communication connections protected by the backup communication connections. Consequently, when the backup communication connections are set up for each main communication connection for load balancing, the total amount of link resources that are consumed by the backup communication connections increases in proportion to the number of the main communication connections.

SUMMARY OF THE INVENTION

Accordingly, a first object of the present invention is to provide a communication connection bypass method that allows a backup communication connection to consume less link resources.

A second object of the present invention is to provide a communication connection bypass method that can achieve the first object described above even when a backup communication connection is established for each of a plurality main communication connections for load balancing of traffic between two given nodes in a network.

According to a communication connection bypass method of a first aspect of the present invention, backup communication connections are established from each node excluding an egress node on a main communication connection. Each backup communication connection is set up between a starting node and the egress node so as not to include any of links and nodes on the main communication connection to be protected. When the backup communication connection is established such that it merges into another pre-established backup communication connection protecting the same main communication connection, the merge is performed at the node that is located at the merge point.

In this manner, merging backup communications together allows a reduction in the amount of link resources involved in the setup of the backup communication connection.

According to a communication connection bypass method of a second aspect of the present invention, backup communication connections are established for each of a plurality of main communication connections for load balancing of traffic between two nodes in a network. The backup communication connection is established from each node excluding an egress node on each backup communication connection. Each backup communication connection is established between a starting node and the egress node so as not to include any of links and nodes on the main communication connection to be protected.

During the setup of the backup communication connection, when the merge is possible into the pre-established backup communication connection protecting one of the main communication connections, the merge is performed en route. Additionally, when the merge is possible into one of the main communication connections, the merge is performed en route.

In this manner, merging backup communication connections together allows a reduction in the amount of link resources involved in the setup of the backup communication connection.

According to a third aspect of the present invention, a node is provided. The node is applied to a connection-oriented network. The connection-oriented network includes a plurality of nodes that include an ingress node and an egress node and a plurality of links that interconnect the plurality of nodes. A main communication connection is established in the connection-oriented network to connect the ingress node and the egress node. The communication connection serves as a communication connection for transferring data. According to this aspect of the present invention, each of the nodes excluding the egress node includes a route calculation section for calculating a route that does not include any of links and nodes between the own node and the egress node. Each of the nodes further includes a signaling section for setting up a backup communication connection for protecting the main communication connection on the calculated route.

According to a fourth aspect of the present invention, a server is provided. The server is applied to a connection-oriented network. The connection-oriented network includes a plurality of nodes that include an ingress node and an egress node, a plurality of links that interconnect the plurality of nodes, and at least one server capable of communicating with the plurality of nodes. A main communication connection is established in the connection-oriented network to connect the ingress node and the egress node. The communication connection serves as a communication connection for transferring data. In the connection-oriented network, when a failure occurs at one of the nodes and links on the main communication connection, at least one backup communication connection is established with at least one node excluding the egress node and functioning as the starting node, and a data transfer route is switched from the main communication connection to the at least one backup communication connection. According to this aspect of the present invention, the server includes a route calculation section for calculating a route between the node functioning as the starting node for the at least one backup communication connection and the egress node such that the route does not include any of the links and nodes on the main communication connection.

BRIEF DESCRIPTION OF THE DRAWINGS

FIG. 4 illustrates an exemplary table within an LSP database shown in FIG. 3;

FIG. 14 illustrates an exemplary table within an LSP database in the second embodiment of the present invention;

DESCRIPTION OF THE PREFERRED EMBODIMENTS

The present invention will now be described with reference to the accompanying drawings in conjunction with embodiments thereof. While the present invention can be implemented in a typical connection-oriented network, description herein will be given of a case in which the present invention is applied to an MPLS network as a typical example of connection-oriented networks. In the following description, an LSP (label switched path), an LSR (label switching router), and a label correspond to a communication connection, an exchanger, and a connection identifier, respectively, in a typical connection-oriented network. For example, in an asynchronous transfer mode (hereinafter simply referred to as an "ATM"), the LSP, LSR, and label correspond to a virtual channel, ATM switch, and virtual channel identifier, respectively.

Figure 2:
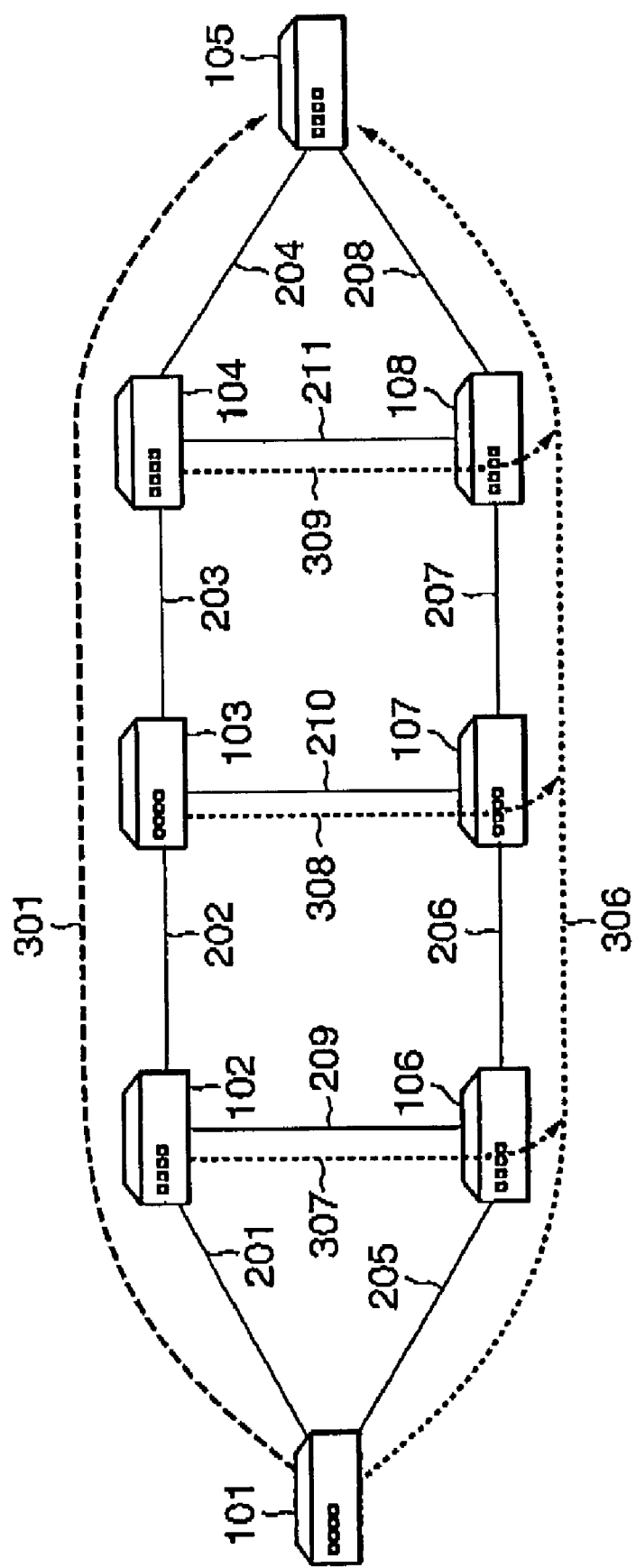
FIG. 2 is a schematic diagram of backup LSPs that are established in a first embodiment of the present invention.

Firstly, description is given of a communication connection bypass system according to a first embodiment of the present invention. FIG. 2 illustrates an example of backup LSPs that are established in the first embodiment.

Figure 1:
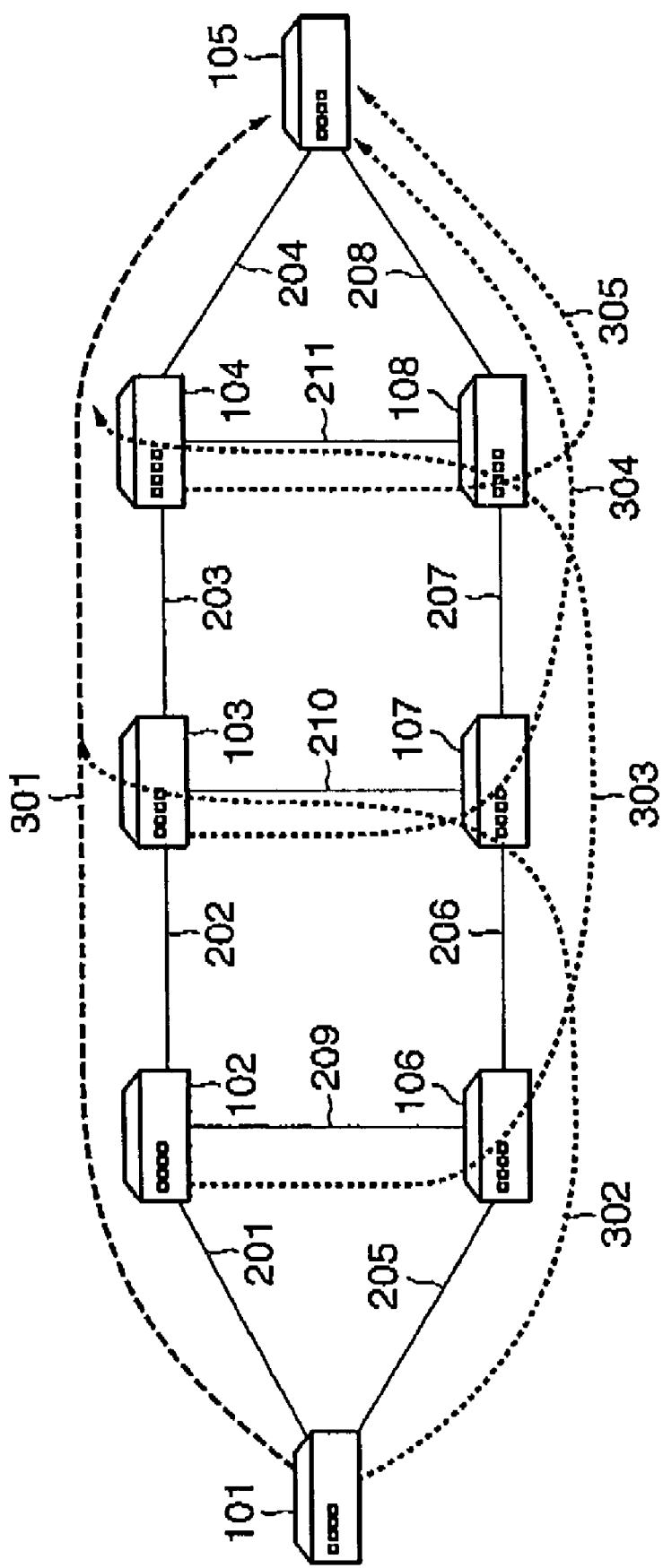
FIG. 1 is a schematic diagram illustrating a method for setting up conventional backup LSPs.

Referring to FIG. 2, a main LSP 301 is established in an MPLS network that is configured with LSRs 101 to 108 and links 201 to 211, as in FIG. 1. In this case, as the backup LSPs, backup LSPs 306 to 309 are established. The backup LSPs 306 to 309 are established so as to be directed to the egress LSR 105, with each LSR except the egress LSR 105 on the main LSP 301 functioning as a starting node. One or some of the LSRs except the egress LSR 105 on the main LSP 301 may be selected such that a backup LSP is established from each selected LSR as the starting node. Each backup LSP must be established between a starting node LSR and the egress LSR 105 so as not share any link or node with the main LSP 301. That is, each backup LSP is established between the starting node LSR and the egress LSR 105 so as not to include any link or node (except the starting node and the egress node) on the main LSP 301 to be protected. In setting up the backup LSP on a route, when another backup LSP has already been established to protect the same main LSP on the route, merging is performed at the LSR that is located at the merge point.

Thus, in FIG. 2, only the backup LSP 306 reaches the egress LSR 105. The other backup LSPs 307 to 309 merge into the backup LSP 306 at the LSRs 106 to 108, respectively.

The setup of the backup LSPs 306 to 309 as described above allows for bypassing a failure, as in the backup LSPs 302 to 305 illustrated in FIG. 1. A backup LSP merges into another backup LSP that has been pre-established for protecting the same main LSP. As a result, link resources that are involved in setting up the backup LSP can be reduced compared to a case in which merging is not used. The term "link resources" herein refers to resources such as a label and a reserved bandwidth that are consumed by the LSP for each link.

For example, in the conventional example shown in FIG. 1, the backup LSPs 302 to 305 consume link resources corresponding to 12 links in total. In contrast, in the embodiment of FIG. 2, the backup LSPs 306 to 309 consume link resources corresponding to only seven links in total.

Figure 3:
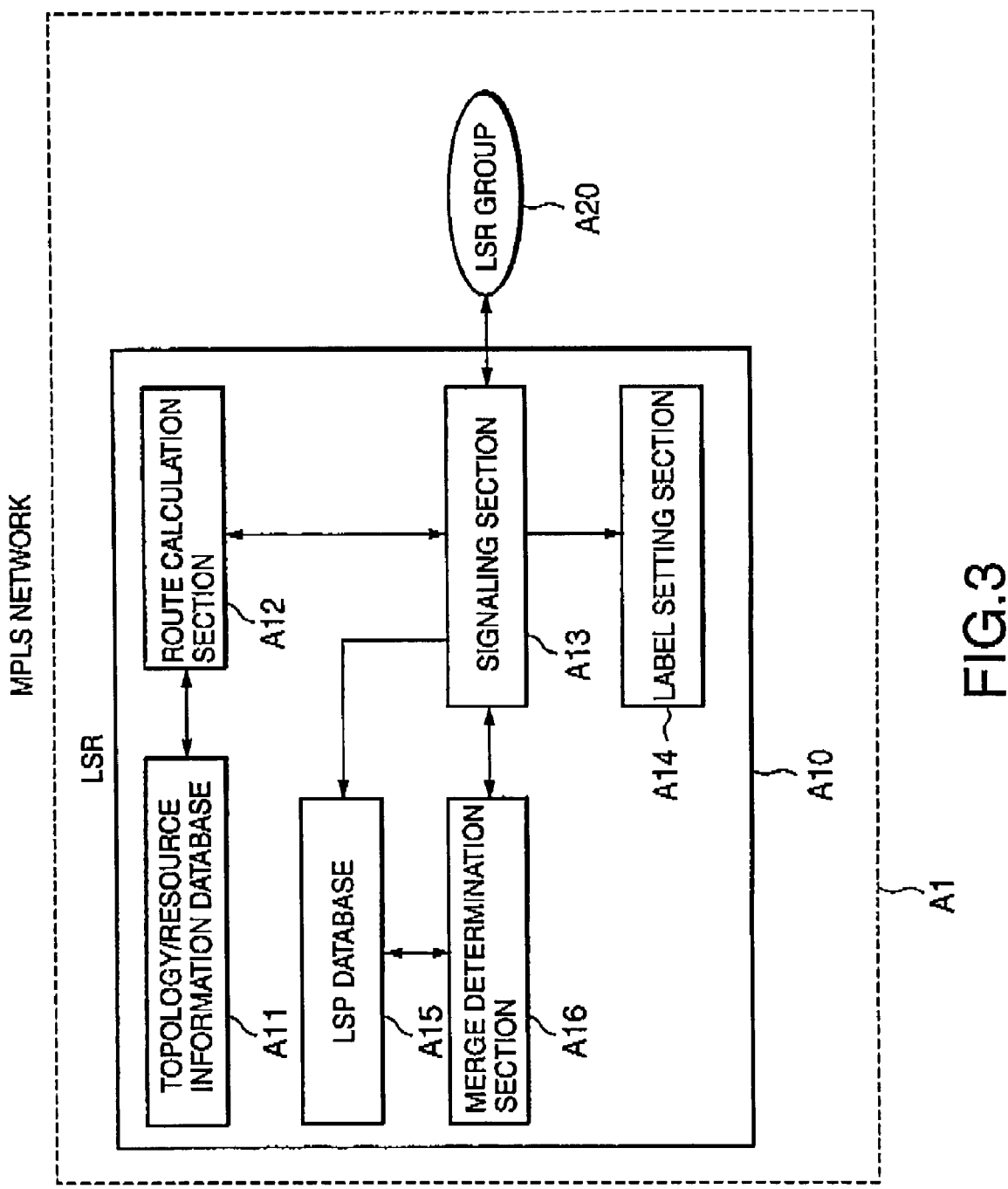
FIG. 3 is a block diagram illustrating a configuration of an LSR that is established in the first embodiment of the present invention.

The configuration of the first embodiment will now be described. Referring to FIG. 3, the first embodiment of the present invention is implemented in an MPLS network A1. An LSR A10 is any one of the LSRs that are provided in the MPLS network A1. The LSR A10 includes a topology/resource information database A11, a route calculation section A12, a signaling section A13, a label setting section A14, an LSP database A15, and a merge determination section A16.

The topology/resource information database A11 stores topology information and resource information of the MPLS network A1. Methods for obtaining such information include obtaining information in an autonomous/distributed fashion by means of a routing protocol, such as Open Shortest Path First (hereinafter referred to as "OSPF"), and obtaining information from centrally collected information by a network management server.

The route calculation section A12 calculates the backup LSP for a given main LSP by using the topology and resource information stored in the topology/resource information database A11. The Dijkstra algorithm or the like may be used for the calculation of the backup LSP.

The signaling section A13 sets up the LSP on a given path in the MPLS network A1 through a signaling procedure with the LSR within a group of LSRs A20. In particular, when setting up the backup LSP, the signaling section A13 sets up the backup LSP on a route calculated by the route calculation section A12. A signaling message can also include an instruction for reserving resources, such as the bandwidth, for the LSP to be established. When setting up the LSP through LSP setup signaling, the signaling section A13 issues an instruction for label binding to the label setting section A14. Also, when a resource reservation is required, the signaling section A13 issues an instruction for reserving resources to the label setting section A14. The signaling section A13 stores information of the established LSP into the LSP database A15. In addition, when setting up the backup LSP, the signaling section A13 queries the merge determination section A16 as to whether or not merging into another LSP is possible. If the merging is possible, the signaling section A13 issues to the label setting section A14 an instruction for merging. Examples of such an LSP signaling section include a CR-LDP (Constraint-Based Routing Label Distribution Protocol) and RSVP-TE (Resource Reservation Protocol—Traffic Engineering). When an ATM network is used instead of the MPLS network A1, a PNNI (Private Network-to-Network Interface) or the like can also be used. While the description in this embodiment will be given using a CR-LDP, the present invention is equally applicable to a case in which a signaling section employing another protocol is used.

The label setting section A14 performs label binding and resource reservation in accordance with the instructions from the signaling section A13.

The LSP database A15 stores, in a table format, information of each LSP established by the signaling section A13. FIG. 4 illustrates an exemplary table within the LSP database A15. In FIG. 4, the table has information concerning LSP identifiers (LSP-ID), main/backup LSP types (Main/Backup), label values (Input Label) that are attached to packets received upstream of the LSPs, label values and output interfaces (Output Label/Interface) that are attached to packets to be transferred downstream of the LSPs, and bandwidths reserved (Reserved Bandwidth) for the LSPs. The information is provided for each LSP that has been established. In addition, when LSPs merge together, information indicating the merge is also included in the table. In the example of FIG. 4, a backup LSP that has an LSP-ID of LSP 2 with an input label fff merges into a backup LSP that has an LSP-ID of LSP 2 with an input label ddd. That is, a plurality of LSPs with different input labels merge into a single LSP with the same output label.

The merge determination section A16 determines whether a backup LSP can merge into another LSP during the setup of the backup LSP. A request for the determination is made from the signaling section A13. The merge determination section A16 sends the result of the determination back to the signaling section A13. The merge determination section A16 also refers to the LSP database A15 when determining whether or not the merge is possible.

An operation of the communication connection bypass system according to the first embodiment will now be described with reference to FIGS. 2 to 8. In the description below, an operation for sequentially setting up backup LSPs from the ingress LSR of a main LSP is described. This operation is referred to as operation A.

Figure 5:
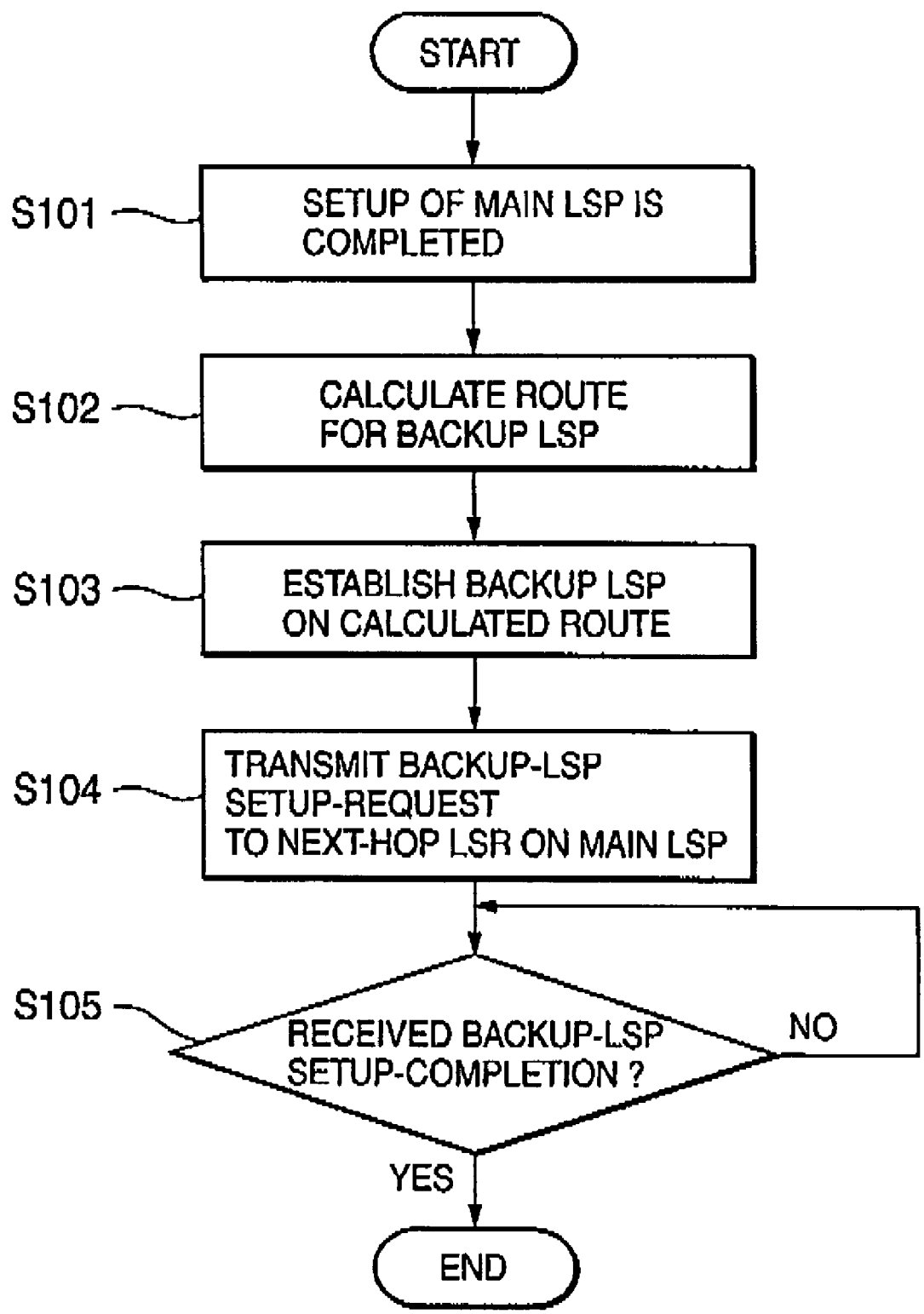
FIG. 5 is a flow diagram illustrating the processes of an ingress LSR in operation A of the first embodiment of the present invention.

Referring to FIG. 5, when the setup of the main LSP is completed (step S101), the ingress LSR of the main LSP uses the route calculation section A12 to calculate a route for the backup LSP from the ingress LSR to the egress LSR of the main LSP (step S102). In the example of FIG. 2, when the setup of the main LSP 301 is completed, the LSR 101 calculates a route for the backup LSP from the LSR 101 up to the LSR 105.

In this case, a calculated route for the backup LSP must not share any link or node, between the ingress LSR and the egress LSR of the main LSP, with the main LSP. That is, the route for the backup LSP is calculated so as to be node-disjoint from the main LSP. In addition, when a resource reservation is required for the backup LSP to be established, the route calculation section A12 calculates a route such that the required resource is satisfied, by referring to the topology/resource information database A11.

Subsequently, using the signaling section A13, a backup LSP is set up on the route for the backup LSP calculated in step S102 (step S103). In the example of FIG. 2, the backup LSP 306 is set up. The signaling section A13 uses a label request message and a label mapping message to set up the backup LSP. The label request message is transferred from the starting point of the backup LSP to be established to the end point thereof along a route desired to be established. On the other hand, the label mapping message is returned from the end point to the starting point in the reverse direction as a response for the label request message. In the description below, establishing the backup LSP also means that the LSR that functions as the starting node for the backup LSP has completed a series of processes from transmitting the label request message to receiving the label mapping message.

Upon the setup of the backup LSP in step S103, the ingress LSR transmits a backup-LSP setup-request message to the next-hop LSR on the main LSP by using the signaling section A13 (step S104). In the example of FIG. 2, a backup-LSP setup-request message is transmitted from the LSR 101 to the LSR 102. The backup-LSP setup-request message includes information as to which main LSP is to be established by a backup LSP to be established. In addition, the backup-LSP setup-request message may include other information concerning the route of the backup LSP that has already been established. The backup-LSP setup-request message may also include information as to on which route the LSR should establish the backup LSP.

Figure 6:
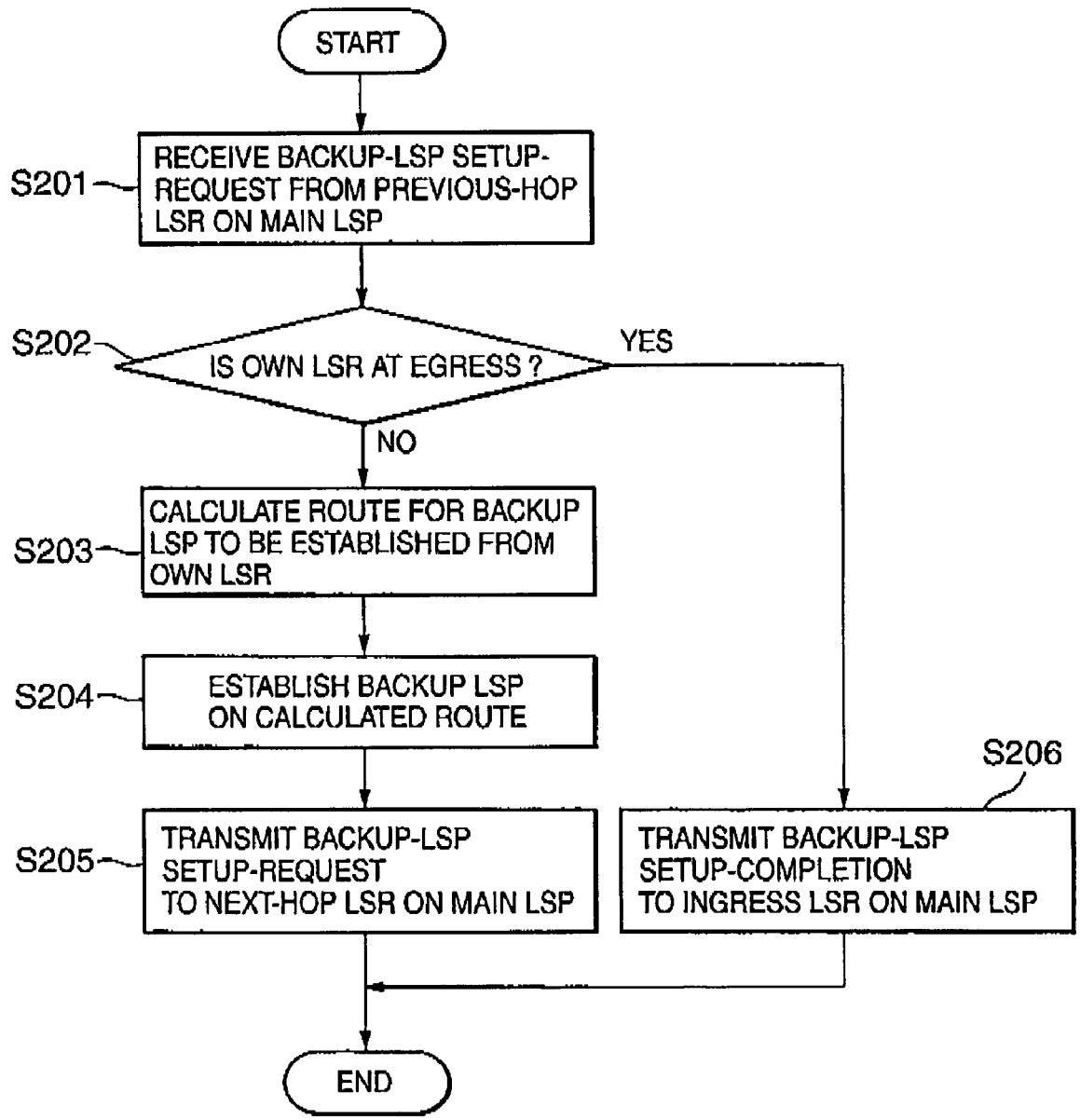
FIG. 6 is a flow diagram illustrating the processes of an LSR on the main LSP in operation A of the first embodiment of the present invention.

Also referring to FIG. 6, when the signaling section A13 in the next-hop LSR on the main LSP receives the backup-LSP setup-request message (step S201), the signaling section A13 examines whether the current, namely, own LSR is the egress LSR on the main LSP by using the LSP database A15 (step S202). If the own LSR is the egress LSR, the signaling section A13 transmits a backup-LSP setup-complete message to the ingress LSR of the main LSP (step S206). If the own LSR is not the egress LSR, the signaling section A13 uses the route calculation section A12 to calculate a route for a backup LSP to be established from the own LSR (step S203). In this case, the route for the backup LSP is addressed to the egress LSR of the main LSP and is calculated so as to be node-disjoint from the main LSP downstream from the own LSR, That is, the backup LSP must not share any link or node, provided between the own LSR and the egress LSR, with the main LSP. In the example of FIG. 2, the route for the backup LSP which has the LSR 102 as the starting node is calculated to be the route through the LSRs 102→106→107→108→105.

Next, an attempt is made to establish the backup LSP on the route for the backup LSP calculated in step S203, using the signaling section A13 (step S204).

Figure 7:
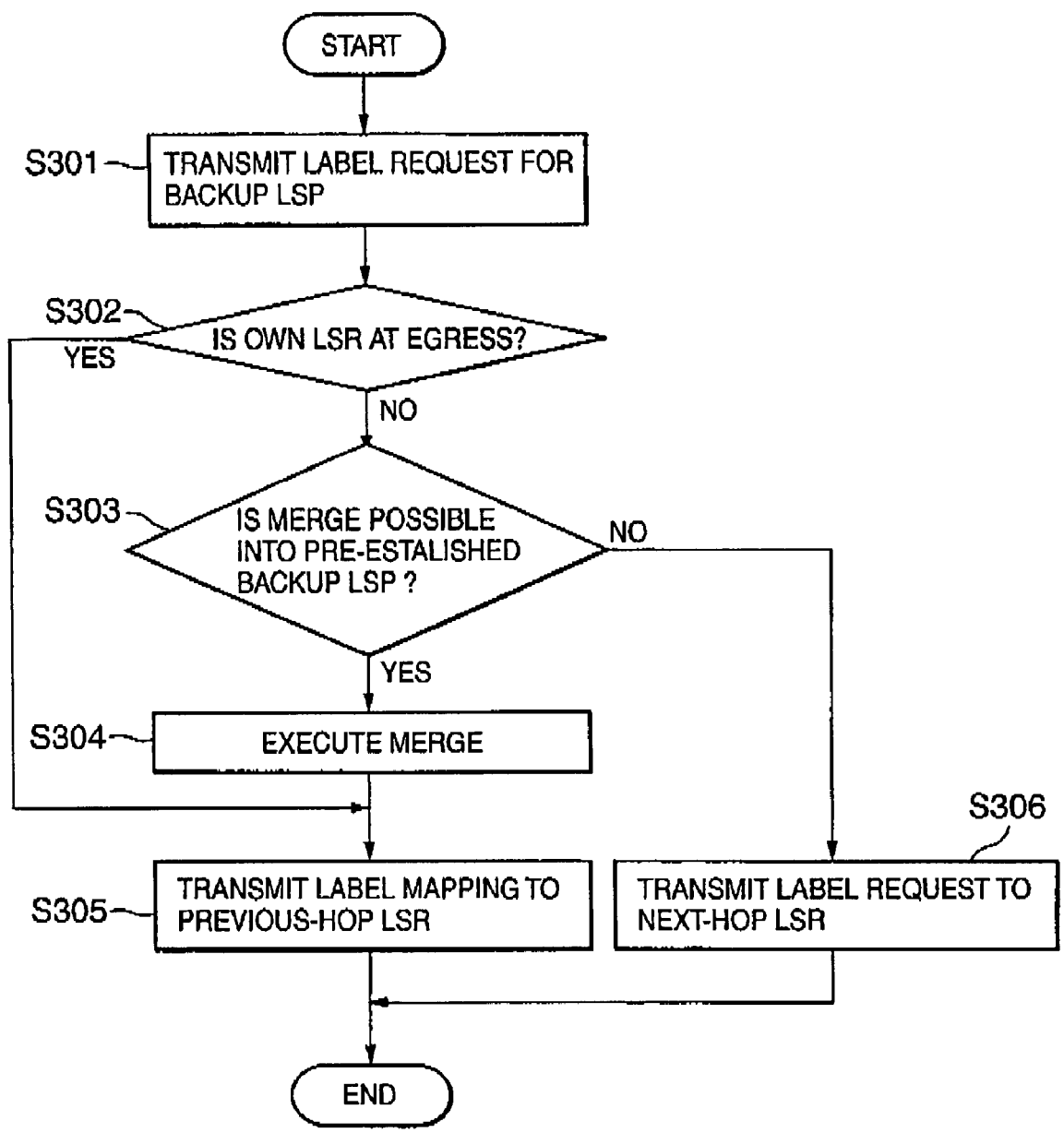
FIG. 7 is a flow diagram illustrating the processes of each LSR on a backup LSP to be established in operation A of the first embodiment of the present invention.

FIG. 7 illustrates processes at each LSR on a route for a backup LSP to be established. In FIG. 7, at the LSR that lies on the route for the backup LSP to be established, the signaling section A13 thereof receives the label request message from an upstream LSR (step S301). The signaling section A13 determines whether the LSR that has received the label request message is the egress LSR of the backup LSP to be established, by referring to the LSP database A15 (step S302). If the own LSR is not the egress LSR, the signaling section A13 uses the merge determination section A16 to determine whether the merge is possible en route into the route of another backup LSP that has already been established for protecting the same main LSP (step S303). If it is determined that the merge is possible in step S303, the signaling section A13 uses the label setting section A14 to perform the merge (step 3304). At the same time, the signaling section A13 stores information of the established backup LSP into the LSP database A15. When performing the merge, the signaling section A13 transmits a label mapping message to the LSR at a hop before the backup LSP to be established (step S305). The label mapping message is transferred up to the LSR that is a starting node for the backup LSP. The process in step S305 is also executed even if it is determined in step S302 that the own LSR is the egress LSR. If it is determined in step S303 that the merge into another backup LSP is not possible, the merge is not performed and the signaling section A13 transfers the label request message to the next-hop LSR (step S306).

When a resource reservation is required for the backup LSP to be established, the ability to satisfy the required resources when the merge is performed becomes a condition for the merge. If a pre-established backup LSP into which the merge is to be performed does not have required resources, either the merge is not performed or it is performed after the resources are increased by an amount corresponding to the shortage in a segment downstream from the LSR at which the merge is to be performed. In general, since the pre-established backup LSP into which the merge is performed is given the same resource reservation as the backup LSP to be established, that condition is automatically satisfied.

In the example of FIG. 2, the backup LSP to be established with the LSR 102 functioning as the starting node can merge into the backup LSP 106 at the LSR 106. Thus, the backup LSP 307 is established such that it merges into the backup LSP 306 at the LSR 106 with the LSR 102 functioning as the starting node.

Referring back to FIG. 6, when the setup of the backup LSP is completed in step S204, the signaling section A13 transmits a backup-LSP setup-request message to the next-hop LSR on the main LSP (step S205). The next-hop LSR receives the backup-LSP setup-request message using the signaling section A13 and recursively repeats the processes of steps S201 to S206.

In step S205, when the setup of the backup LSP from the LSR on the main LSP is completed, the backup-LSP setup-request message is transmitted to the next-hop LSR of the main LSR Alternatively, every time the setup of a single backup LSP is completed, a message for notifying that the setup of the backup LSP is completed may be transmitted to the ingress LSR of the main LSP.

Also, when the setup of the backup LSP is completed in step S204 and then if the own LSR is located directly before the egress node of the main LSP, the setups of a series of backup LSPs from the corresponding LSRs on the main LSP have already been completed. Thus, instead of executing the process in step S205, a backup-LSP setup-complete message can also be transmitted directly from the own LSR to the ingress LSR of the main LSP. For executing this process, however, the own LSR needs to be identified as the LSR that is located directly before the egress node of the main LSP.

Referring back to FIG. 5, the ingress LSR of the main LSP receives the backup-LSP setup-complete message using the signaling section A13, and confirms that backup LSP is established from the corresponding LSR on the main LSP (step S105).

The sequence for each message in the processes of steps S101 to S105, 8201 to 8206, and S301 to 3306 will be described with reference to FIGS. 8A and 8B.

Figures 8A, 8B:
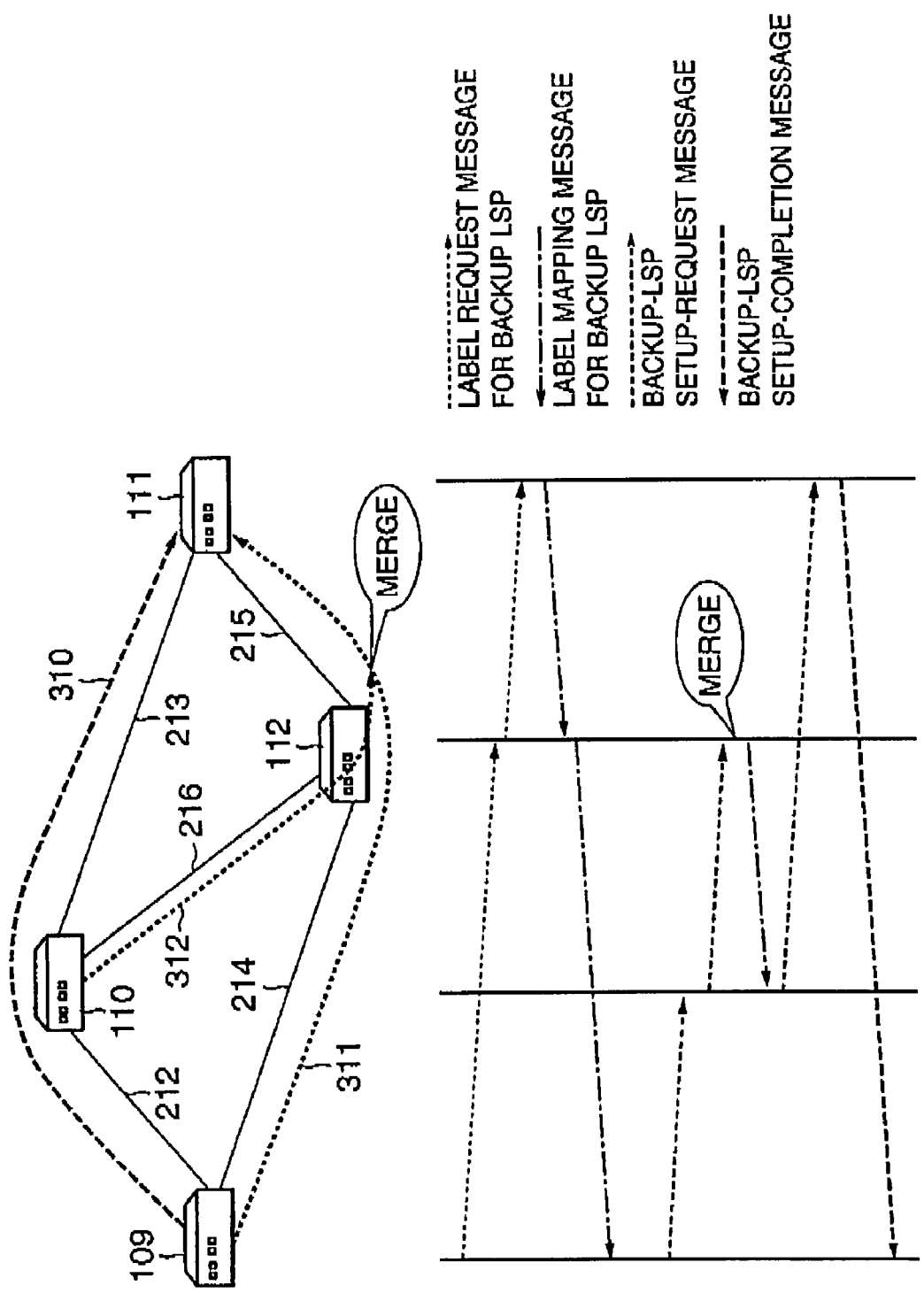
FIGS. 8A and 8B are diagrams illustrating a message sequence in operation A of the first embodiment of the present invention.

In FIG. 8A, LSRs 109 to 112 are provided in a network and are interconnected by links 212 to 216. The main LSP 310 is established with the node 109 being the ingress LSR and the node 111 being the egress LSR. FIG. 8B illustrates the message sequence required for establishing backup LSPs 311 and 312.

First, a label request message for establishing the backup LSP 311 is transferred along the route of the LSRs 109→112→111. In turn, a label mapping message is returned along the reverse route as a response. Next, the LSR 109 transmits a backup-LSP setup-request message to the LSR 110. Upon receiving the backup-LSP setup-request message, the LSR 110 attempts to transfer a label request message along the route of the LSRs 110→112→111. However, the LSR 112 that has received the label request message merges into the backup LSP 311 and returns a label mapping message to the LSR 110. Thus, the backup LSP 312 is established such that it merges into the backup LSP 311 at the LSR 112, with the LSP 110 functioning as the starting node.

Next, the LSR 110 transmits a backup-LSP setup-request message to the LSR 111. The LSR 111 receives the backup-LSP setup-request message and then transmits a backup-LSP setup-complete message to the LSR 109 since the LSR 111 is the egress LSR of the main LSP 310.

The operation A described above is characterized by establishing backup LSPs sequentially from the ingress LSR of the main LSP. The effect of reducing the amount of link resources required for establishing backup LSPs by means of merging is largely subject to which route a pre-established backup LSP goes through. Accordingly, the selection of a route during the setup of a backup LSP becomes more significant as an LSR functioning as the starting node for the backup LSP becomes closer to the ingress LSR of the main LSP. Thus, the selection of a route is the most significant when a backup LSP that has an ingress LSR as the starting node is established.

Another operation of the first embodiment will now be described with reference to FIGS. 7 and 9 to 11. In the operation A of the first embodiment, backup LSPs are established sequentially from the ingress LSR of the main LSP. In the description below, however, an operation (hereinafter referred to as "operation B") in which backup LSPs are established sequentially from the egress LSR of the main LSP will be described. In the operation B, a label mapping message used in establishing the main LSP includes a command for demanding the setup of the backup LSP for protecting the main LSP.

Figure 9:
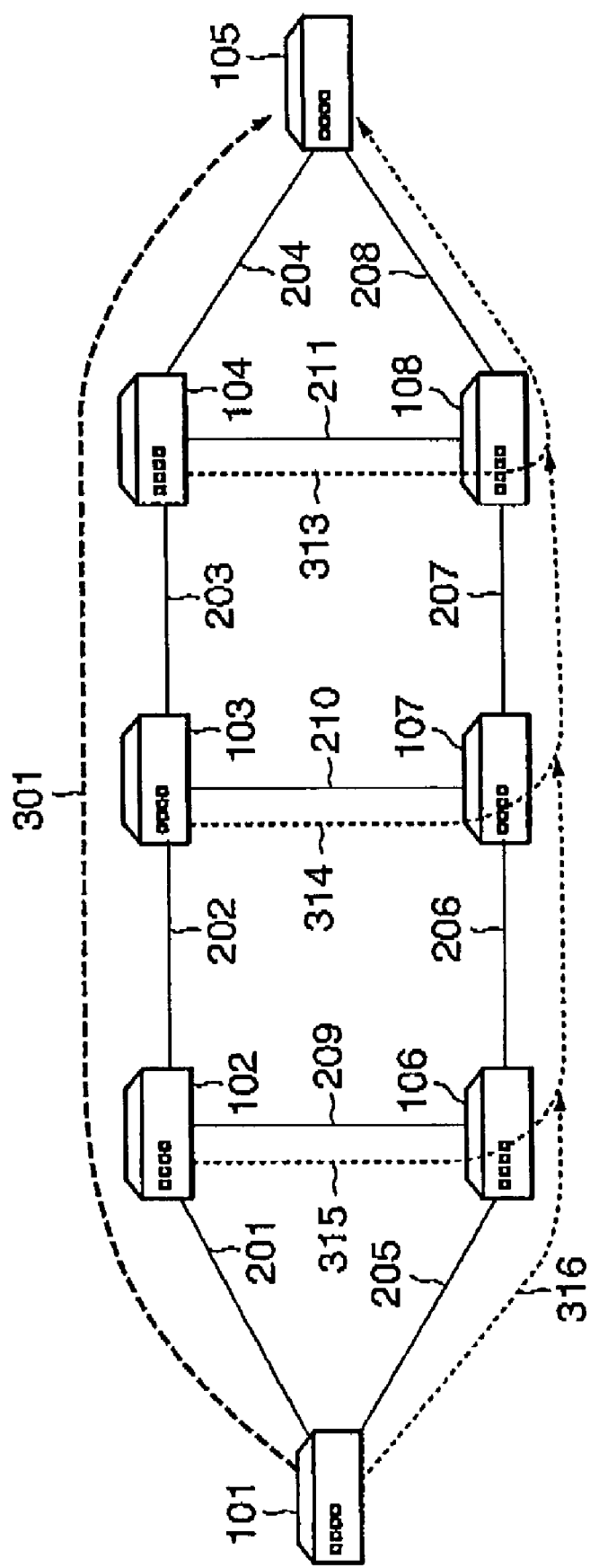
FIG. 9 is a schematic diagram of backup LSPs to be established in operation B of the first embodiment of the present invention.
Figure 10:
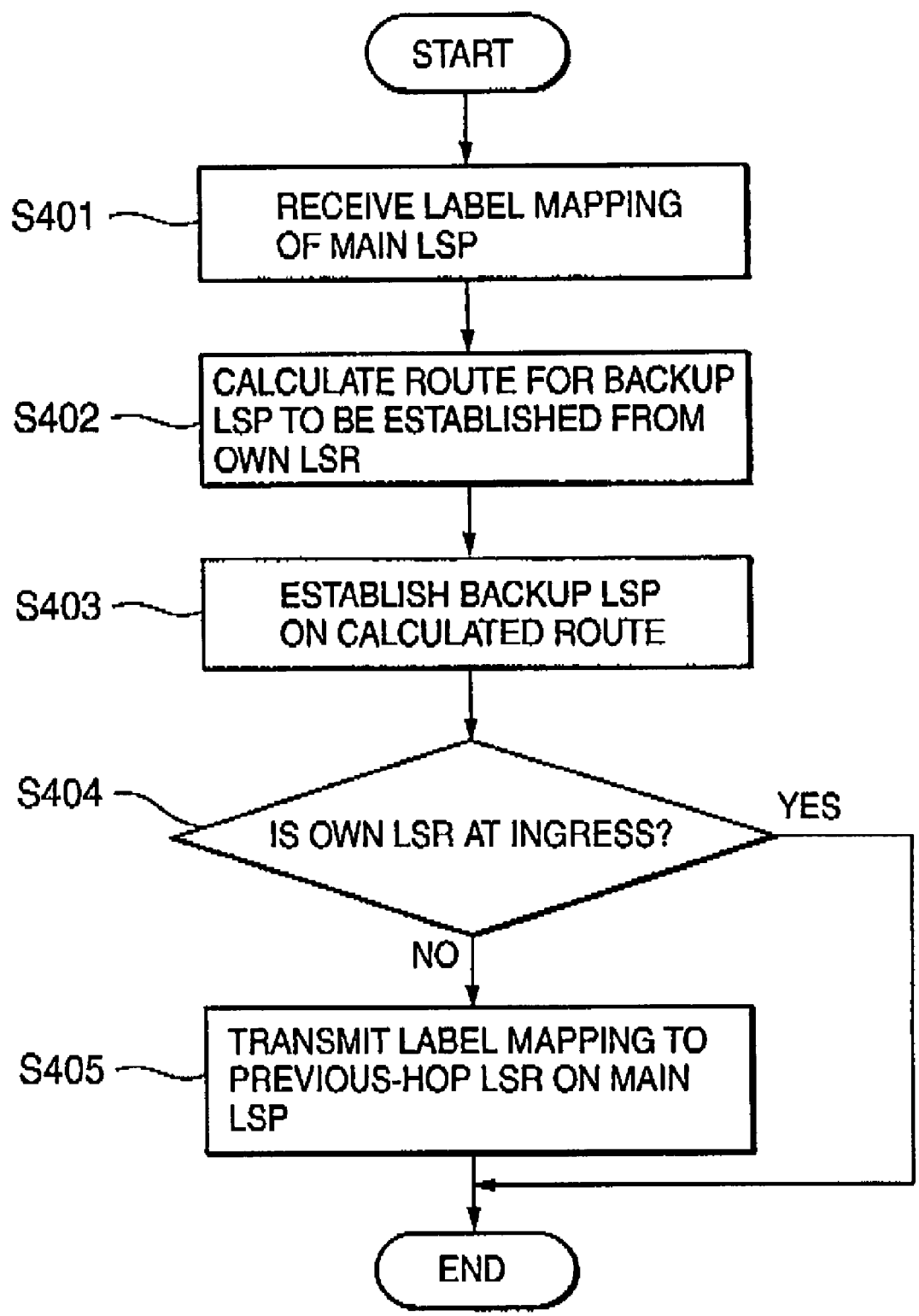
FIG. 10 is a flow diagram illustrating the processes of an LSR on the main LSP in operation B of the first embodiment of the present invention.

Referring to FIG. 10, when the signaling section A13 in the LSR on the main LSP receives a label mapping message with respect to the setup of the main LSP (step S401), the LSR that has received the label mapping message calculates the route for the backup LSP to be established therefrom using the route calculation section A12 (step S402). In the same manner as operation A, the route for the backup LSP is addressed to the egress LSR of the main LSP and is calculated so as to be node-disjoint from the main LSP downstream from the own LSR. In the example of FIG. 9, when the LSR 104 receives a label mapping message from the LSR 105, the route for the backup LSP is calculated to be the route through the LSRs 104→108→105 with the LSR 104 functioning as the starting node.

Next, on the route for the backup LSP calculated in step S402, the backup LSP is established using the signaling section A13 (step S403). In this case, the processes at each LSR on the route for the backup LSP to be established is analogous to the processes of steps S301 to S306 shown in FIG. 7. If the merge is possible into another pre-established backup LSP protecting the same main LSP, the merge is performed somewhere en route. In the case of setting up the backup LSP with the LSR 104 shown in FIG. 9 functioning as the starting node, the backup LSP is established up to the LSR 105 without the merge, since no backup LSP into which the merge is possible exists en route.

When a backup LSP has been established in step S403, by referring to the LSP database A15, the LSR that has established the backup LSP examines whether or not the own LSR is the ingress LSR on the main LSP (step S404). If the own LSR is the ingress LSR, this means that the setups of a series of backup LSPs for protecting the main LSP have been completed. If the own LSR is not the ingress LSR, the signaling section A13 transmits a label mapping message for the main LSP to a previous-hop LSR on the main LSP (step S405). The signaling section A13 of the previous-hop LSR receives the label mapping message and recursively repeats the processes of steps S401 to S405.

The sequence for each message in operation B described above will be explained with reference to FIGS. 11A and 11B.

Figure 11A:
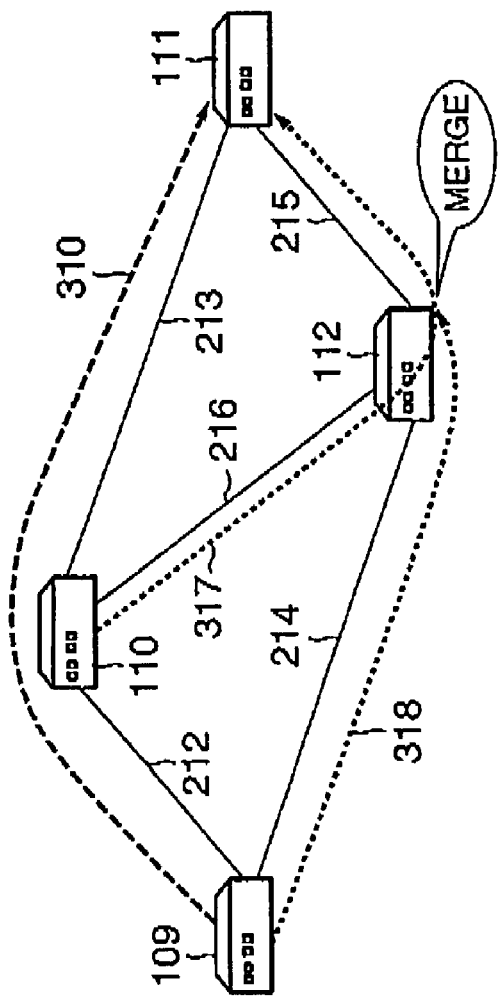
FIGS. 11A and 11B are diagrams illustrating a message sequence in operation B of the first embodiment of the present invention.
Figure 11B:
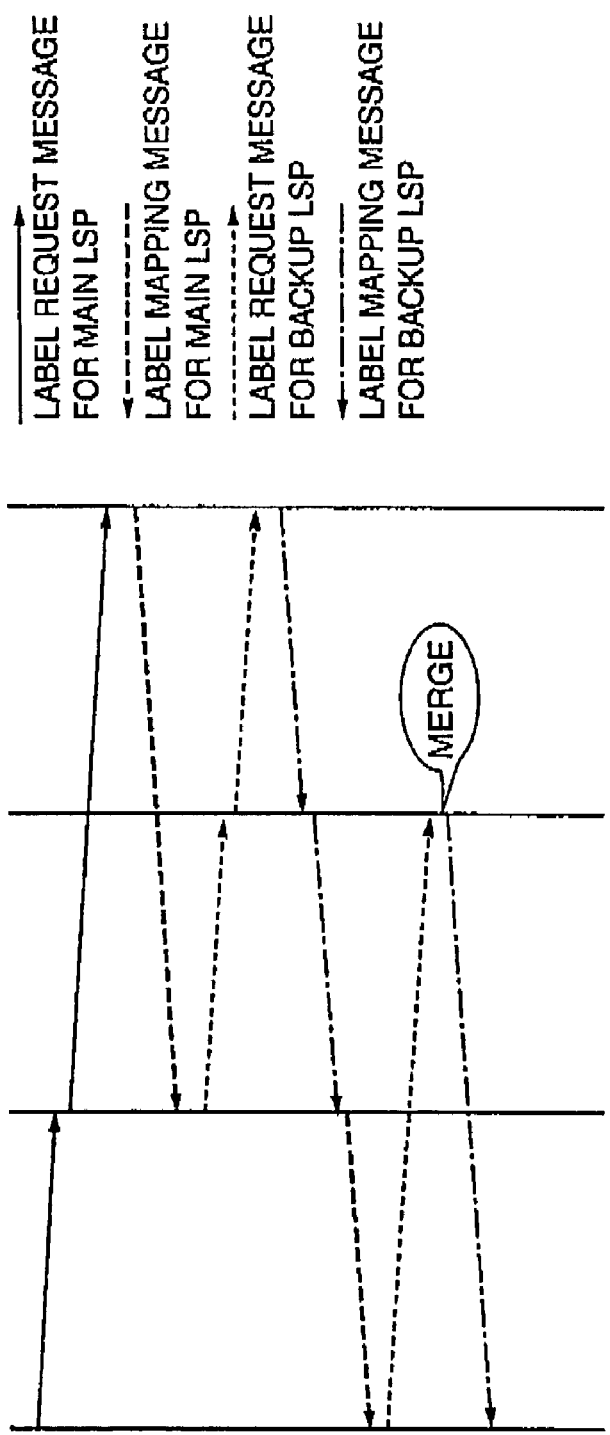

The network configuration shown in FIG. 11A is analogous to that in FIG. 8A. FIG. 11B illustrates the message sequence required for setting up a main LSP 310 and backup LSPs 317 and 318.

First, a label request message for setting up the main LSP 310 is transferred along the route of the LSRs 109→110→111. The LSR 110 receives a label mapping message as a response for the label request message from the LSR 111. The LSR 110 calculates the route for the backup LSP and transfers the label request message along the route of LSRs 110→112→111. Since no other backup LSP into which the merge is to be performed exists en route, no merge is performed in this case. The label mapping message for the label request message from the LSR 110 is then transferred from the LSR 111 to the LSR 110 via the LSR 112. The LSR 110 receives the label mapping message and then transmits the label mapping message for the main LSP 310 to the LSR 109. The LSR 109 calculates the route for the backup LSP and transfers the label request message along the route of the LSRs 109→112→111. At this point, the LSR 112 that has received the label request message merges into the backup LSP 317, and returns the label mapping message to the LSR 109. Thus, with the LSR 109 functioning as the starting node, the backup LSP 318 that merges into the backup LSP 317 at the LSR 112 is established.

The operation B is characterized by establishing backup LSPs sequentially from the egress LSR of the main LSP. In the operation B, the selection of the route during the setup of the backup LSP is more significant as the LSR functioning as the starting node for the backup LSP becomes closer to the egress LSR of the main LSP, in contrast to the operation A.

In the operations A and B, each LSR that serves as the starting node for the backup LSP calculates the backup LSP in an autonomous/distributed fashion. Another possible method is follows. That is, an optimum tree for backup LSPs to be ultimately established is intensively calculated at a network management server or at a given selected LSR in a network. Each backup LSP is then established so as to generate the optimum tree that has been intensively calculated. This method is particularly effective when the optimization of the effect in reducing the total amount of link resources that are consumed by backup LSPs is desired.

Figure 12:
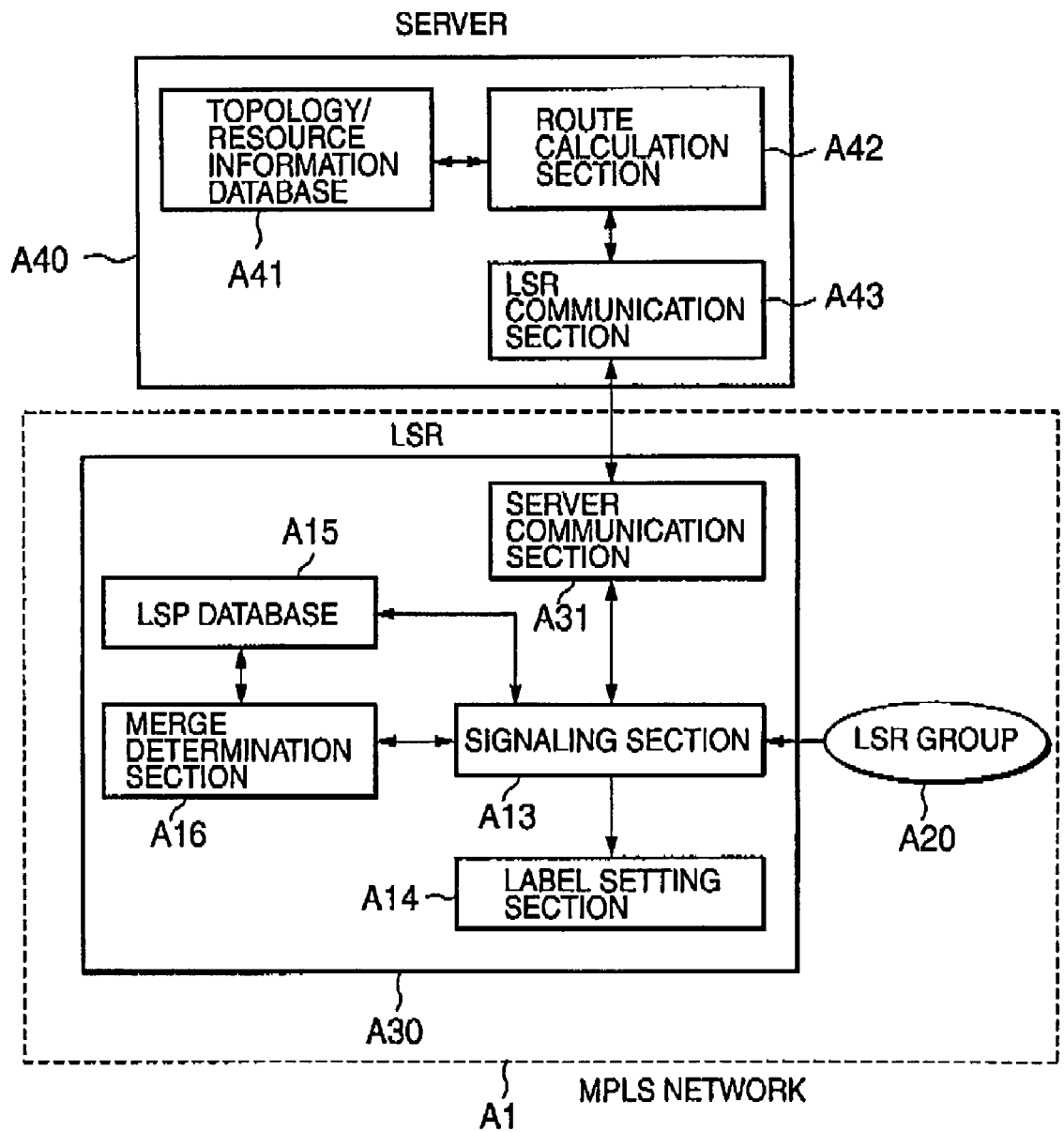
FIG. 12 is a block diagram illustrating a configuration of a server and LSRs according to a modification of the first embodiment to achieve the method mentioned above.

FIG. 12 illustrates a configuration of a server and LSRs according to a modification of the first embodiment to achieve the method described above. In FIG. 12, an LSR A30 Is any one of LSRs that are provided in the MPLS network A1. The difference from the LSR A10 shown in FIG. 3 is that the LSR A30 has a server communication section A31 instead of the topology/resource information database A11 and the route calculation section A12 shown in FIG. 3.

One or a plurality of servers A40 is provided in the MPLS network A1. The server A40 communicates with the server communication section A31 within each LSR in the MPLS network A1 via an LSR communication section A43. The server A40 has a topology/resource information database A41 and a route calculation section A42.

The topology/resource information database A41 stores topology and resource information of the MPLS network A1 in the same manner as the topology/resource information database A11 shown in FIG. 3.

At a network management server or a given selected LSR, the route calculation section A42 intensively calculates an optimum tree of backup LSPs for a main LSP. The route calculation section A42 issues an instruction, for establishing the backup LSP on the calculated route, to the LSR A30 via the LSR communication section A43.

An advantage of the first embodiment, including the modification described above, will be described, In the first embodiment, the backup LSPs are established from each LSR except the egress LSR of the main LSP. Each backup LSP must be established so as not to share any link or node with the main LSP to be protected, between the starting node LSR and the egress LSR. During the setup of the backup LSP, when the merge is performed into another pre-established backup LSP protecting the same main LSP, the merge is performed at the LSR that is located at the merge point.

In the method for establishing the backup LSP described in conjunction with the related art shown in FIG. 1, since the merging point of the backup LSP and the main LSP is different for each backup LSP, backup LSPs cannot merge together. In the first embodiment, however, since the merging point of all the backup LSPs and the main LSP is the egress LSR of the main LSP, this allows backup LSPs to merge together. In this manner, merging backup LSPs together can reduce link resources involved in setting up backup LSPs.

For example, in the related art shown in FIG. 1, the backup LSPs 302 to 305 consume link resources corresponding to 12 links in total. In contrast, in the embodiment shown in FIG. 2, the backup LSPs 306 to 309 consume link resources corresponding to only seven links in total. In addition, any backup LSP established between the ingress LSR and the egress LSR is node-disjoint from the main LSP. Thus, the main LSP can use the backup LSPs as LSPs for load balancing of traffic between the ingress LSR and the egress LSR. However, since the backup LSPs are not protected by any additional backup LSP, bypassing cannot be performed in case of a link or node failure on the backup LSP. Thus, in case of a failure, in order to provide a bypass for each of LSPs established for traffic load balancing between the ingress LSR and the egress LSR, the backup LSP must be established for each LSP.

A communication connection bypass system according to a second embodiment of the present invention will now be described in detail. The configuration of each LSR in the second embodiment is similar to that illustrated in FIG. 3.

Figure 13:
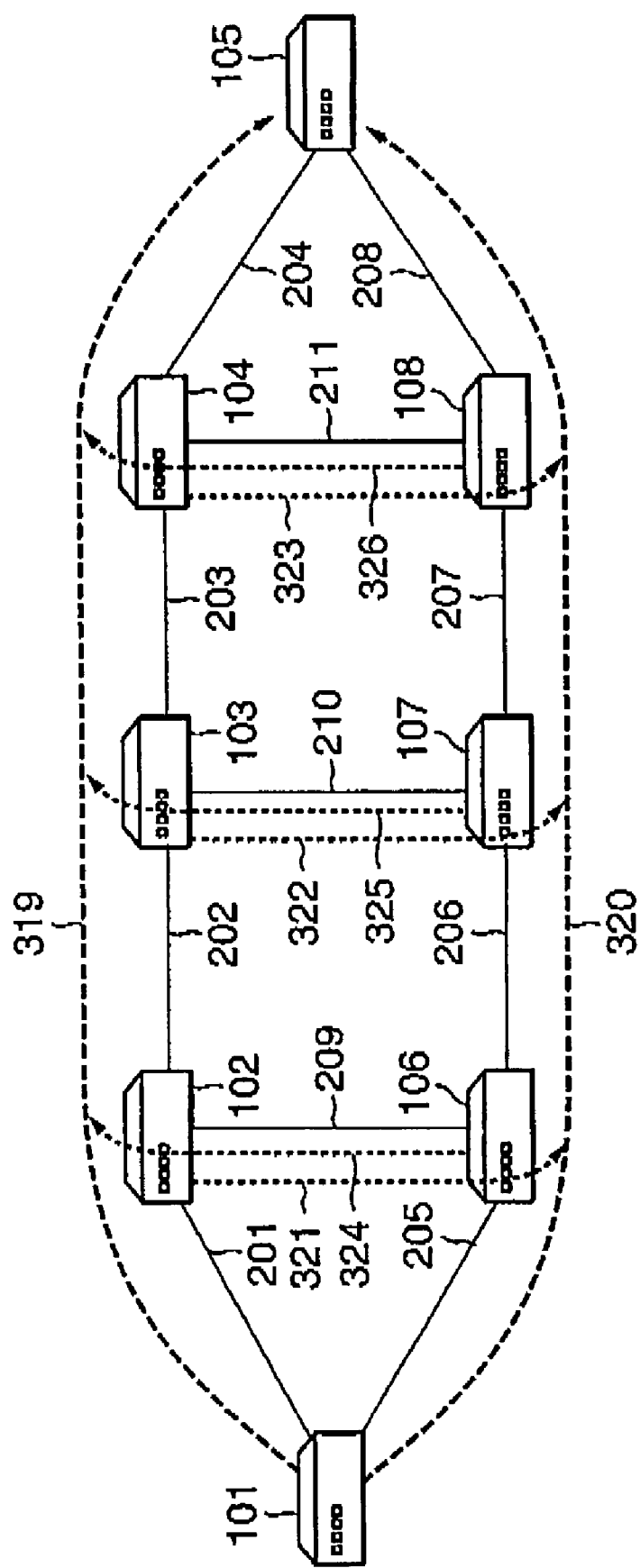
FIG. 13 is a schematic diagram illustrating backup LSPs established in a second embodiment of the present invention.

FIG. 13 illustrates an example of backup LSPs established in the second embodiment.

In FIG. 13, main LSPs 319 and 320 are established in the same network configuration as in FIG. 1. The main LSPs 319 and 320 have the same ingress LSR (LSR 101) and the same egress LSR (LSR 105), and are node-disjoint from each other. These two main LSPs 319 and 320 are commonly used for load balancing of traffic going through between the LSR 101 and the LSR 105. In such an arrangement, the main LSPs 319 and 320 are herein referred to as belonging to the same peer group.

In the second embodiment, a table stored in the LSP database A15 needs to include identifiers for distinguishing an LSP group belonging to the same peer group from an LSP group belonging to another peer group, in addition to the contents of the table shown in FIG. 4 of the first embodiment. That is, as shown in FIG. 14, an LSP group belonging to the same peer group is distinguished by using group identifiers ("groups GA, GB, . . . ," shown in FIG. 14).

For each main LSP belonging to the same peer group, backup LSPs for failure recovery are established. A backup LSPs is established from each node except the egress LSR of the main LSPs. One or some of LSRs except the egress LSR on the main LSPs may be selected such that a backup LSP is established from each selected LSR. Each backup LSP must be established between the starting node LSR and the egress LSR so as not to share any link or node with the main LSP to be protected. During the setup of the backup LSP, if the merge is possible into another pre-established backup LSP protecting the same main LSP, the merge is performed en route. In addition, if the merge is possible into another main LSP belonging to the same peer group, the merge is also performed en route in a similar manner.

In this case, backup LSPs 321 to 326 are established as shown in FIG. 13. The backup LSPs 321 to 323 are established for protecting the main LSP 319 and merge into the other main LSP belonging to the same peer group at the corresponding LSRs 106 to 108. Meanwhile, the backup LSPs 324 to 326 are established for protecting the main LSP 320 and merge into the other main LSP belonging to the same peer group at the corresponding LSRs 102 to 104.

The setup of the backup LSPs 321 to 326 as described above allows traffic load balancing using two main LSPs, as well as failure bypassing when a failure occurs on any one of the main LSPs. Each backup LSP merges not only into another pre-established backup LSP protecting the same main LSP but also into the other main LSP belonging to the same peer group. This arrangement can reduce link resources involved in establishing the backup LSP compared to a case in which merging is not used.

While the above description has been given of an example in which two main LSPs are used, the present invention is equally applicable to a case in which three or more main LSPs are established so as to be node-disjoint from each other. In this case, conditions for merging the backup LSP to be established for protecting the main LSP into another main LSP or backup LSP can be generalized as (1) or (2) below.

Condition (1): a pre-established backup LSP into which a merge is to be performed is a backup LSP for protecting a main LSP belonging to the same peer group. When, however, traffic is directed into the backup LSP from an LSR at which the merge is to be performed, the route of the traffic must not pass through a link or node, except the egress node, on the main LSP to be protected by the backup LSP.

Condition (2): a pre-established LSP into which a merge is to be performed is a main LSP belonging to the same peer group, except a main LSP protected by a backup LSP to be established.

Figure 15:
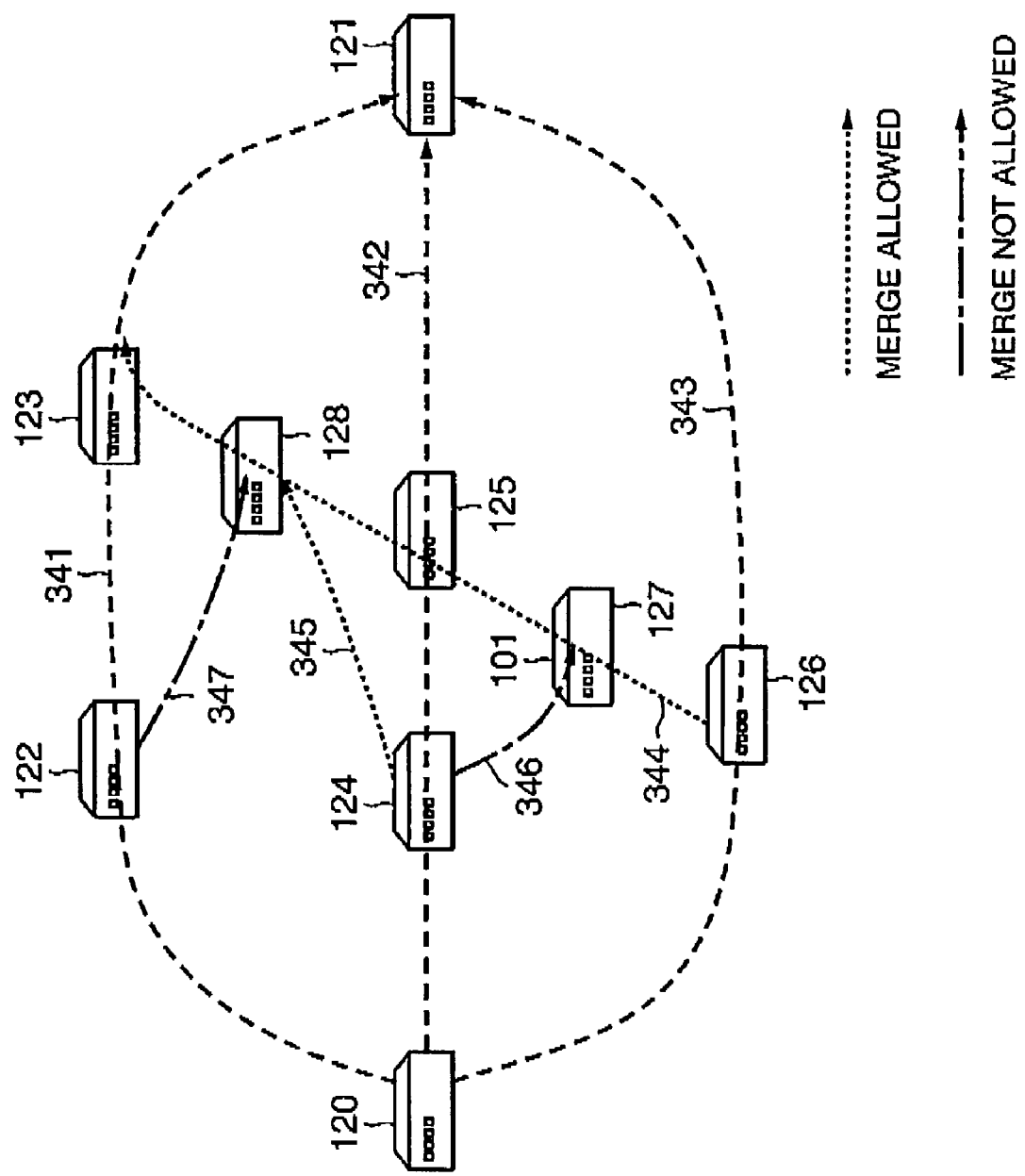
FIG. 15 is a schematic diagram to illustrate merge conditions for backup LSPs in the second embodiment of the present invention.

FIG. 15 is a schematic diagram illustrating merge conditions (1) and (2) described above. Three main LSPs 341 to 343 belonging to the same peer group are established between LSRs 120 and 121.

First, an attempt is made to establish a backup LSP 344 for protecting the main LSP 343 from an LSR 126 and to merge the backup LSP 344 into the main LSP 341 at an LSR 123. Since this merge satisfies merge condition (2), the merge is possible.

Next, in the state in which the backup LSP 344 is established, an attempt is made to establish backup LSPs 345 to 347. The backup LSP 345 serves to protect the segment from an LSR 124 to the LSR 121 on the main LSP 342. It is now assumed that an attempt is made to merge the backup LSP 345 into the LSP 344 at an LSR 128. This merge is possible because merge condition (1) is satisfied.

The backup LSP 346 serves to protect the segment from the LSR 124 to the LSR 121 on the main LSP 342. It is now assumed that an attempt is made to merge the backup LSP 346 into the backup LSP 344 at an LSR 127. With this merge, since traffic flowing through the backup LSP 346 into the backup LSP 344 passes through the main LSP 342 at an LSP 125, merge condition (1) is not satisfied. Thus, this merge is not possible.

The backup LSP 347 serves to protect the segment from an LSR 122 to the LSR 121 on the main LSP 341. It is now assumed that an attempt is made to merge the backup LSP 347 into the backup LSP 344 at the LSR 128. With this merge, since traffic flowing from the backup LSP 347 to the backup LSP 344 passes through the main LSP 341 from the LSP 123 to the LSR 121, merge condition (1) is not satisfied. Thus, this merge is not possible.

The operation of the second embodiment will now be described with reference to FIGS. 6, 13, and 16 to 18. An example of a case in which two main LSPs belong to the same peer group is shown in FIG. 6, but the same operation can be applicable to a case in which three or more main LSPs are used.

Figure 16:
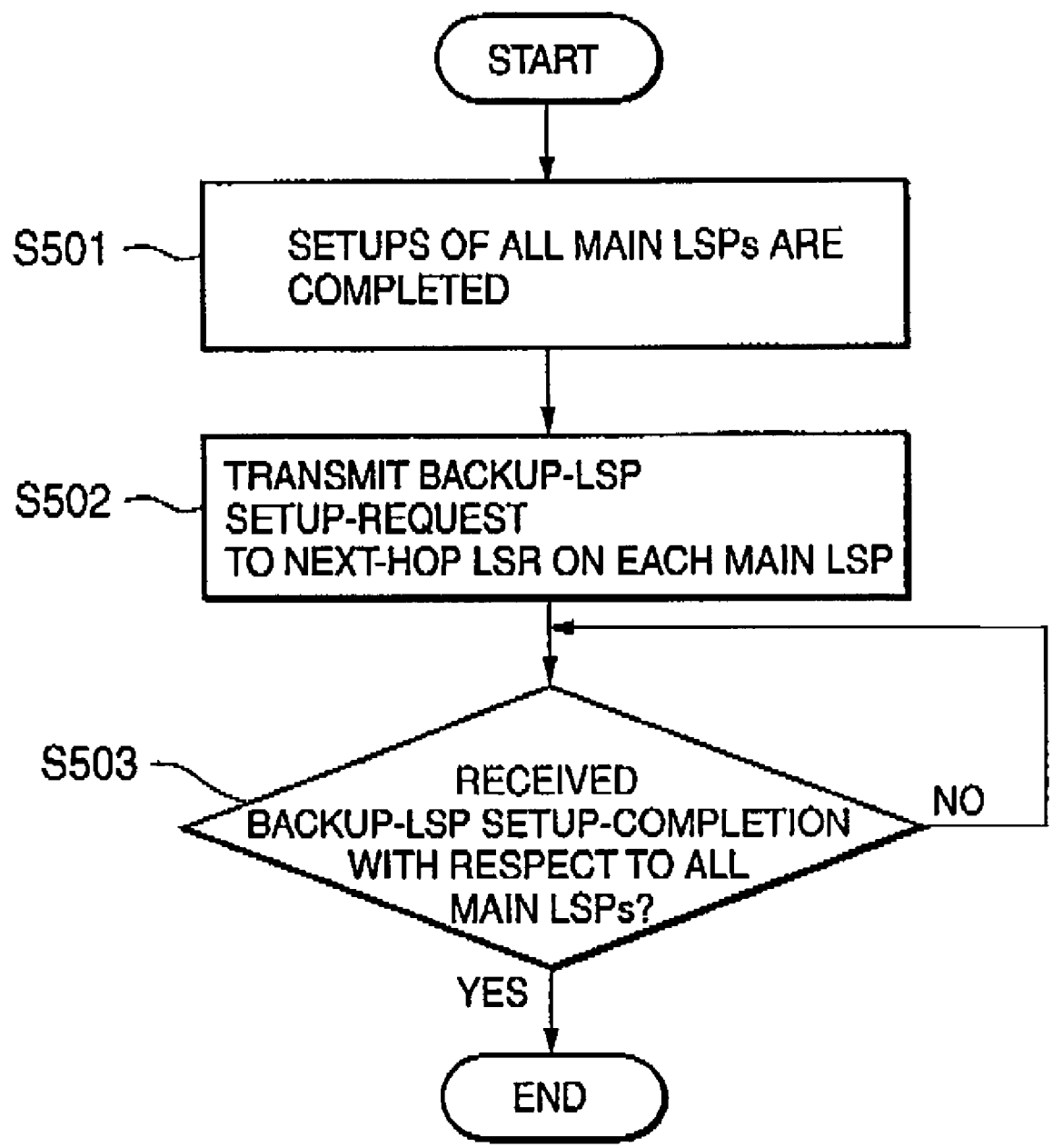
FIG. 16 is a flow diagram illustrating the operation of the ingress node in the second embodiment of the present invention.

Referring to FIG. 16, when the setups of all main LSPs belonging to the same peer group are completed (step S501), the signaling section A13 (see FIG. 3) within the ingress LSR of the main LSPs transmits a backup-LSP setup-request message to the next-hop LSR on each main LSP (step S502).

Figure 17:
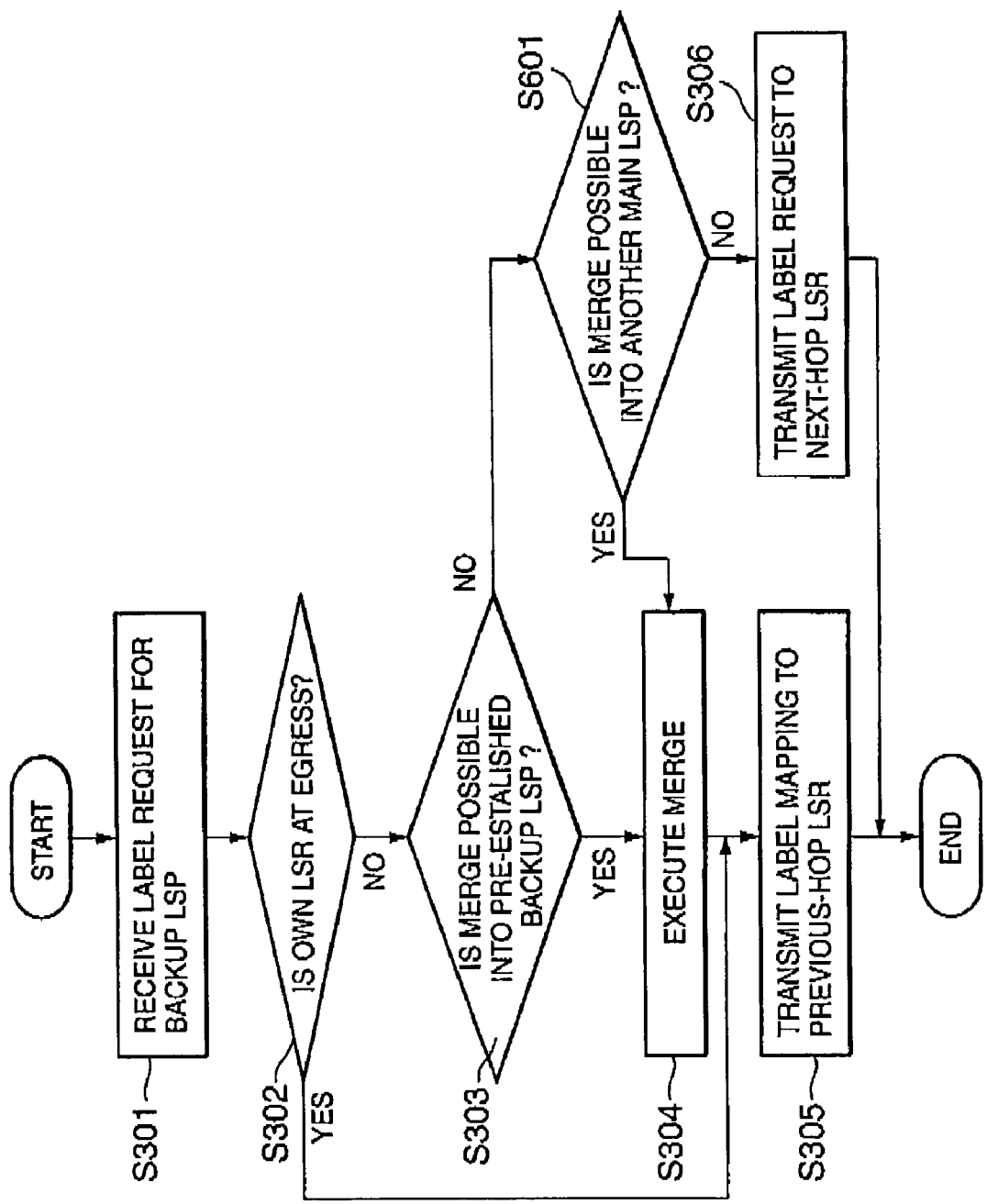
FIG. 17 is a flow diagram illustrating the operation of each LSR on a backup LSP to be established in the second embodiment of the present Invention.

The processes at the signaling section A13 within each LSR on the main LSPs upon receiving the backup-LSP setup-request message is the same as the processes in steps S201 to S206 shown in FIG. 6. The processes in steps S201 to S206 are executed for each main LSP in an asynchronous manner, FIG. 17 is a flow diagram illustrating the processes at each LSR on a route for a backup LSP to be established. The processes shown in FIG. 17 are analogous to those shown in FIG. 7, except for the following point. That is, a determination as to whether or not merging into another main LSP is possible (step S601) is added to the determination as to whether or not merging into another pre-established backup LSP is possible (step S303). In the step S601, if it is determined that the merge is possible, merging is performed. As conditions for merging into another LSP in each step S301 and S601, conditions (1) and (2) previously described are used.

When a resource reservation is required for the backup LSP to be established, the ability to satisfy the resources required by the backup LSP when the merge is performed becomes a condition for the merge. In particular, when the backup LSP to be established merges into the main LSP belonging to the same peer group, this main LSP must satisfy both resources required by the main LSP itself and resources required by the backup LSP. If the pre-established backup LSP or the main LSP into which the merge is to be performed does not have resources required for the merge, either the merge is not performed or it is performed after the resources are increased by an amount corresponding to the shortage in a segment downstream from the LSR at which the merge is to be performed.

For example, when reserved bandwidths for a plurality of main LSPs belonging to the same peer group are different from each other, the pre-established backup LSP or the main LSP into which the merge is performed has a different reserved bandwidth from that of the backup LSP to be established from now on, When the merge is performed in the backup LSP that has already been established, a condition for the merge is that the reserved band of that backup LSP be greater than that of the backup LSP to be established from now on. On the other hand, when the merge is performed into the main LSP that has already been established, a condition for the merge is that the reserved band of that main LSP be greater than the total of a reserved band being used by the main LSP itself and the reserved band of the backup LSP to be established.

When a series of setups of backup LSPs for protecting the main LSP is completed in accordance with the processes in step S201 to S206 illustrated in FIG. 6, the signaling section A13 at the egress LSR transmits the backup-LSP setup-complete message to the ingress LSR of the main LSP (step S206).

Referring back to FIG. 16, the signaling section A13 at the ingress LSR receives the backup-LSP setup-complete message with respect to each main LSR At the time when the signaling section A13 receives backup-LSP setup-complete messages with respect to all the main LSPs belonging to the same peer group, the signaling section A13 confirms that the setups of backup LSPs for protecting all the main LSPs are completed (step S503).

The sequence for each message in the operation of the second embodiment will be described with reference to FIGS. 18A and 18B.

Figure 18A:
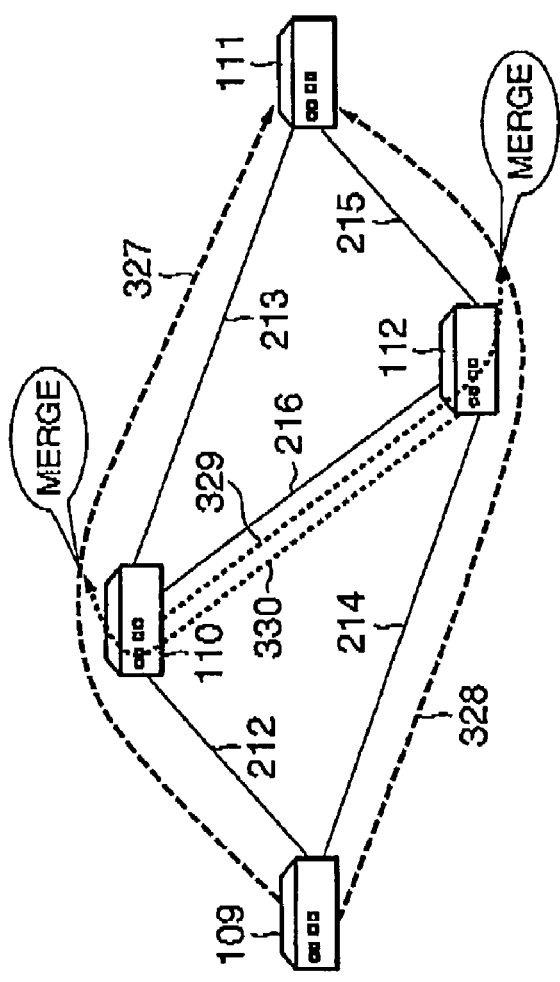
FIGS. 18A and 18B are diagrams illustrating a message sequence in the operation of the second embodiment of the present invention.
Figure 18B:
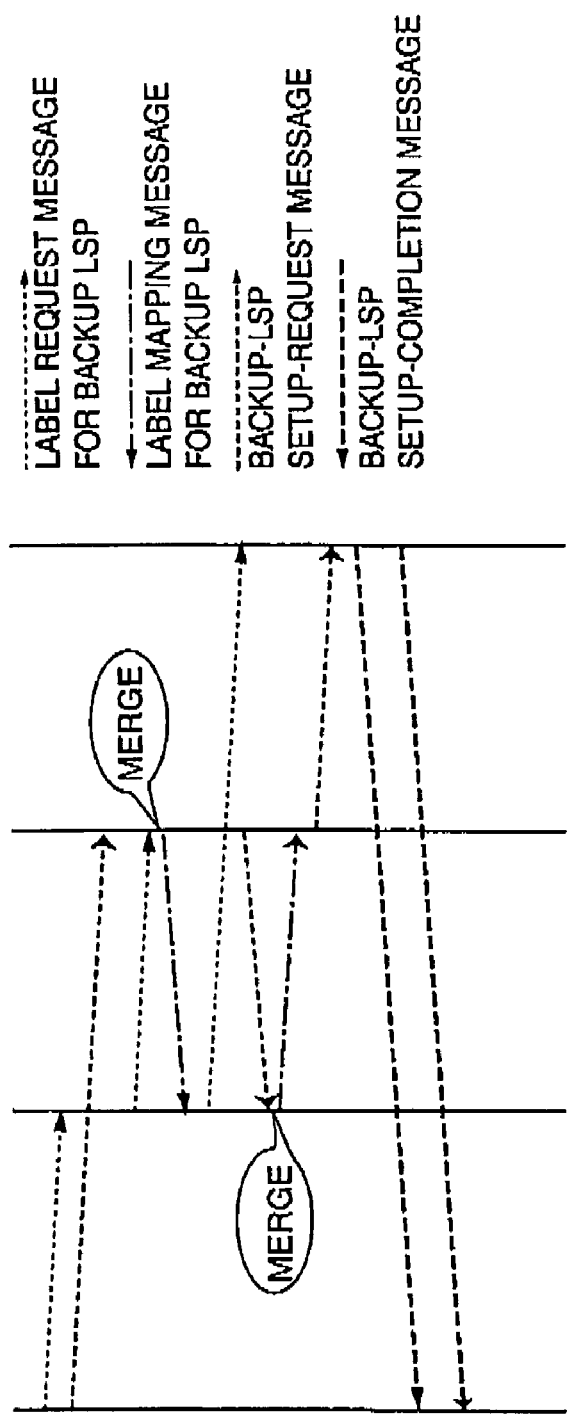

The network configuration shown in FIG. 18A is analogous to the configuration shown in FIG. 8A, except that main LSPs 327 and 328 are provided. FIG. 18B illustrates the message sequence required for establishing backup LSPs 329 and 330 for protecting the main LSPs 327 and 328.

When the setups of the main LSPs 327 and 328 are both completed, the LSR 109 transmits backup-LSP setup-request messages to the LSRs 110 and 112. The backup-LSP setup-request message transmitted to the LSR 110 serves to request the setting of the backup LSP for protecting the main LSP 327. Also, the backup-LSP setup-request message transmitted to the LSR 112 serves to request the setup of the backup LSP for protecting the LSP 328.

Upon receiving the backup-LSP setup-request message, the LSR 110 attempts to transfer a label request message along the route of the LSRs 110→112→111. However, the LSR 112 that has received the label request message merges into the main LSP 328 and returns a label mapping message to the LSR 110. Thus, the backup LSP 329 that merges into the main LSP 328 at the LSR 112 is established with the LSR 110 functioning as the starting node.

Next, the LSR 110 transmits a backup-LSP setup-request message to the LSR 111. Upon receiving the backup-LSP setup-request message, the LSR 111 transmits a backup-LSP setup-complete message to the LSR 109 since the LSR 111 is the egress LSR of the main LSP 327.

When the LSR 112 receives the backup-LSP setup-request message, the LSR 112 attempts to transfer a label request message along the route of the LSRs 112→110→111. However, the LSR 110 that has received the label request message merges into the main LSP 327 and returns a label mapping message to the LSR 112. Thus, the backup LSP 330 is established such that it merges into the main LSP 327 at the LSR 110 with the LSR 112 functioning as the starting node. Subsequently, the LSR 112 transmits a backup-LSP setup-request message to the LSR 111. The LSR 111 receives the backup-LSP setup-request message and transmits a backup-LSP setup-complete message to the LSR 109 since the LSR 111 is the egress LSR of the main LSP 328.

At the time when the LSR 119 receives the backup-LSP setup-complete messages with respect to all the main LSPs, the LSR 119 confirms that backup LSPs for protecting the main LSPs 327 and 328 have been established.

In the second embodiment, description has been given of the operation in which the backup LSPs are established sequentially from the ingress LSR of the main LSP, as in operation A of the first embodiment. However, as in operation B of the first embodiment, an operation in which the backup LSPs are established sequentially from the egress LSR of the main LSP may be executed.

Additionally, in the second embodiment, each LSR that functions as the starting node for the backup LSP calculates a route for the backup LSP in an autonomous/distributed fashion. Other possible methods include the following method. That is, an optimum tree for backup LSPs to be ultimately established is intensively calculated at a network management server or at a given selected LSR in a network. Each backup LSP is then established so as to generate the optimum tree that has been intensively calculated. This method is particularly effective when the optimization of the effect in reducing the total amount of link resources that are consumed by backup LSPs is desired. In this case, the same configurations shown in FIG. 12 can be used for the server and the LSRs. Since the operations of the server and the LSRs are analogous to those shown in FIG. 12, the description thereof will be omitted.

An advantage of the second embodiment will now be described.

In the second embodiment, when a backup LSP is established for each of a plurality of main LSPs for load balancing of traffic between two given nodes in a network, backup LSPs are established for each LSR except the egress LSR of each backup LSP.

During the setup of a backup LSP, if a merge is possible into a pre-established backup LSP protecting one of the main LSPs, the merge is performed en route. In addition, if the merge is possible into one of the main LSPs, the merge is performed en route in the same manner.

In this manner, merging the backup LSP to be established into another pre-established backup LSP allows for reduction in link resources involved in the setup of the backup LSP.

Figure 21:
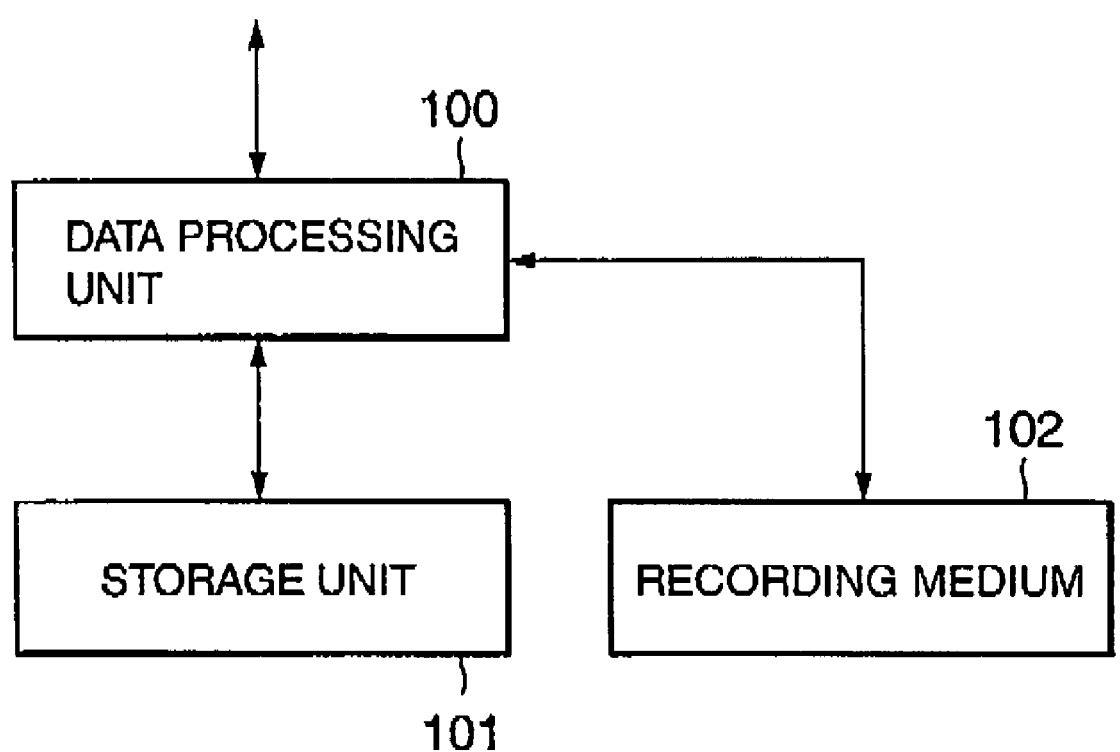
FIG. 21 is a block diagram illustrating the configuration of a node or server used in the present invention.

Description will now be given of an embodiment of communication programs that implement the communication connection bypass method of the present invention and a recording medium in which the communication programs are recorded. In this embodiment, as shown in FIG. 21, the nodes and server described above each include a data processing unit 100, a storage unit 101, and a recording medium 102 in which a communication program is recorded. The recording medium 102 is implemented with, for example, a magnetic disk, semiconductor memory, or CD-ROM. The recording medium 102 may also be provided in the storage unit 101.

With regard to nodes, a communication program for controlling each node is read into the storage unit 101 from the recording medium 102, secures regions for storing data and the like necessary for the storage unit 101, and controls the operation thereof. Through the control of the communication program, the data processing unit 100 executes the same processing as the communication processing of the nodes in the first and second embodiments.

Meanwhile, with regard to the server, a communication program for controlling the server is read into the storage unit 101 from the recording medium 102, secures regions for storing data and the like necessary for the storage unit 101, and controls the operation thereof. Through the control of the communication program, the data processing unit 100 executes the same processing as the communication processing of the server in the first and second embodiments.

Specifically, the communication program for controlling each node is read into the node shown in FIG. 3 and is executed. This results in the configuration of the route calculation section A12, the signaling section A13, the label setting section A14, and the merge determination section A16. Also, the communication program secures regions for storing information necessary for the topology/resource information database A11 and the LSP database A15 in the storage unit 101. Through the control of the communication program, the data processing unit 100 executes the same processing as the communication processing of the nodes in the first and second embodiments.

In the same manner, the communication program for controlling each node is read into the node shown in FIG. 12 and is executed. This results in the configuration of the server communication section A31, the signaling section A13, the label setting section A14, and the merge determination section A16. Also, the communication program secures regions for storing information necessary for the LSP database A15 in the storage unit 101, and controls the operation thereof. Through the control of the communication program, the data processing unit 100 executes the same processing as the communication processing of the nodes in the first and second embodiments.

In addition, the communication program for controlling a server is read into the server shown in FIG. 12 and is executed. This results in the configuration of the LSR communication section A43 and the route calculation section A42. Also, the communication program secures regions for storing information necessary for the topology/resource information database A41 in the storage unit 101 and controls the operation thereof. Through the control of the communication program, the data processing unit 100 executes the same processing as the communication processing of the server in the first and second embodiments.

A first specific example in connection with the first embodiment of the present invention will now be described with reference to FIG. 19. In this example, backup LSPs are established using the processes in operation A described in the first embodiment.

Figure 19:
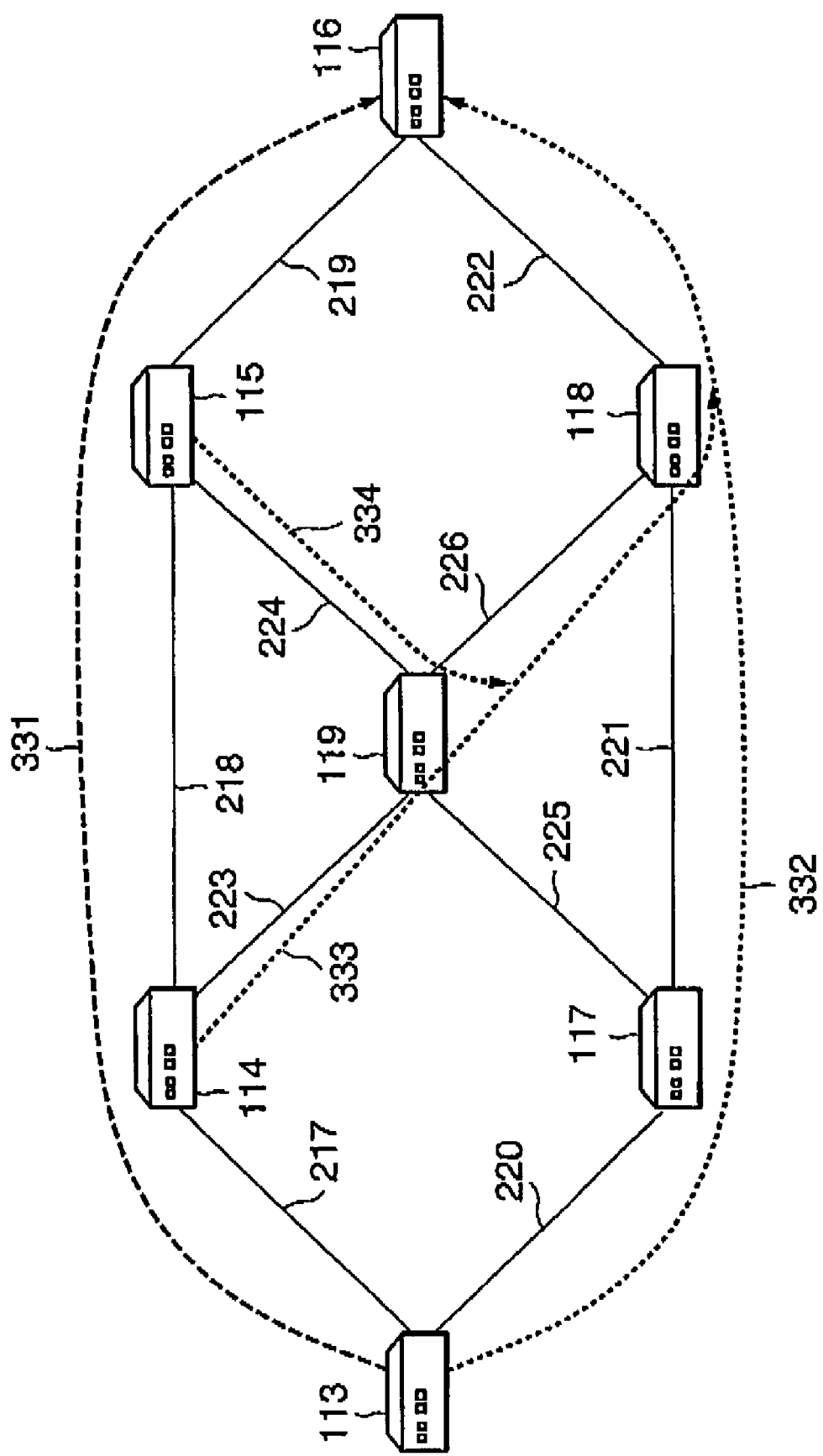
FIG. 19 is a schematic diagram illustrating backup LSPs to be established in the second embodiment of the present invention.

In FIG. 19, in an MPLS network configured with LSRs 113 to 119 and links 217 to 226, backup LSPs for protecting a main LSP 331 are set up. In this case, a 1-Mbps band is reserved for the main LSP 331.

Upon receiving a label mapping message used in the setup of the main LSP 331, the LSR 113 calculates a route for a backup LSP that originates from the LSR 113. Conditions for the route for the backup LSP is that the route be calculated so as to be node-disjoint from the main LSP 331 in the segment from the LSRs 113 to 116 and have the same 1-Mbps residual band as the reserved band of the main LSP 331. In this case, it is assumed that the route for the backup LSP is calculated to be the route through the LSRs 113→117→118→116.

Next, the LSR 113 attempts to set up a backup LSP 332 by transmitting a label request message into the route of the calculated backup LSR The label request message includes information concerning route information of the backup LSP 332 and the reserved bandwidth being 1 Mbps.

The label request message, which is transmitted from the LSR 113, is transferred in the order of the LSRs 117→118→116, and a label mapping message is in turn transferred along the reverse route from the LSR 116. At the time when the LSR 113 receives the label mapping message, the setup of the backup LSP 332 is completed.

Upon receiving the label mapping message, the LSR 113 then transmits a backup-LSP setup-request message to the LSR 114.

The LSR 114 receives the backup-LSP setup-request message and then calculates the route for the backup LSP that originates from the LSR 114. Conditions for the route for the backup LSP is that the route be calculated to be node-disjoint from the main LSP 331 in the segment from the LSR 114 to the LSR 116 and have the same 1-Mbps residual band as the reserved band of the main LSP 331. In this case, it is assumed that the route for the backup LSP is calculated to be the route through the LSRs 114→119→118→116.

Next, the LSR 114 transmits a label request message in the same manner as the processes at the LSR 113 for setting up the backup LSP 332. The label request message is directed to be transferred in the order of the LSRs 119→118→116. However, at the time when the LSR 118 receives the label request message, the LSR 118 determines that a merge is possible into the backup LSP 332 protecting the main LSP 331. Thus, the label request message is terminated at the LSR 118, and a label mapping message is transferred along the route in the reverse direction. In this manner, a backup LSP 333 that merges into the backup LSP 332 at the LSR 118 is established with the LSR 114 functioning as the starting node.

Upon receiving the label mapping message with respect to the LSP 333, the LSR 114 in turn transmits a backup-LSP setup-request message to the LSR 115.

The LSR 115 receives the backup-LSP setup-request message and then calculates the route for the backup LSP that originates from the LSR 115. Conditions for the route for the backup LSP are that the route be calculated so as to be node-disjoint from the main LSP 331 in the segment from the LSR 115 to the LSR 116 and have the same 1-Mbps residual band as the reserved band of the main LSP 331. In this case, it is assumed that the route for the backup LSP is calculated to be the route through the LSRs 115→119→118→116.

Next, the LSR 115 transmits a label request message in the same processes at the LSR 113 for setting up the backup LSP 332. The label request message is directed to be transferred in the order of the LSRs→119→118→116. However, at the time when the LSR 119 receives the label request message, the LSR 119 determines that the merge is possible into the backup LSP 333 protecting the main LSP 331. Thus, the label request message is terminated at the LSR 111, and a label mapping message is transferred along the route in the reverse direction. In this manner, a backup LSP 334 that merges into the backup LSP 333 at the LSR 119 is established with the LSR 115 functioning as the starting node.

Upon receiving the label mapping message with respect to the backup LSP 334, the LSR 115 transmits a backup-LSP setup-request message to the LSR 116.

Upon receiving the backup-LSP setup-request message, the LSR 116 transmits a backup-LSP setup-complete message to the LSR 113 since the LSR 116 is the egress LSR of the main LSP 331.

The LSR 113 receives the backup-LSP setup-complete message to confirm that the backup LSP from each LSR on the main LSP 331 has been completed.

Figure 20:
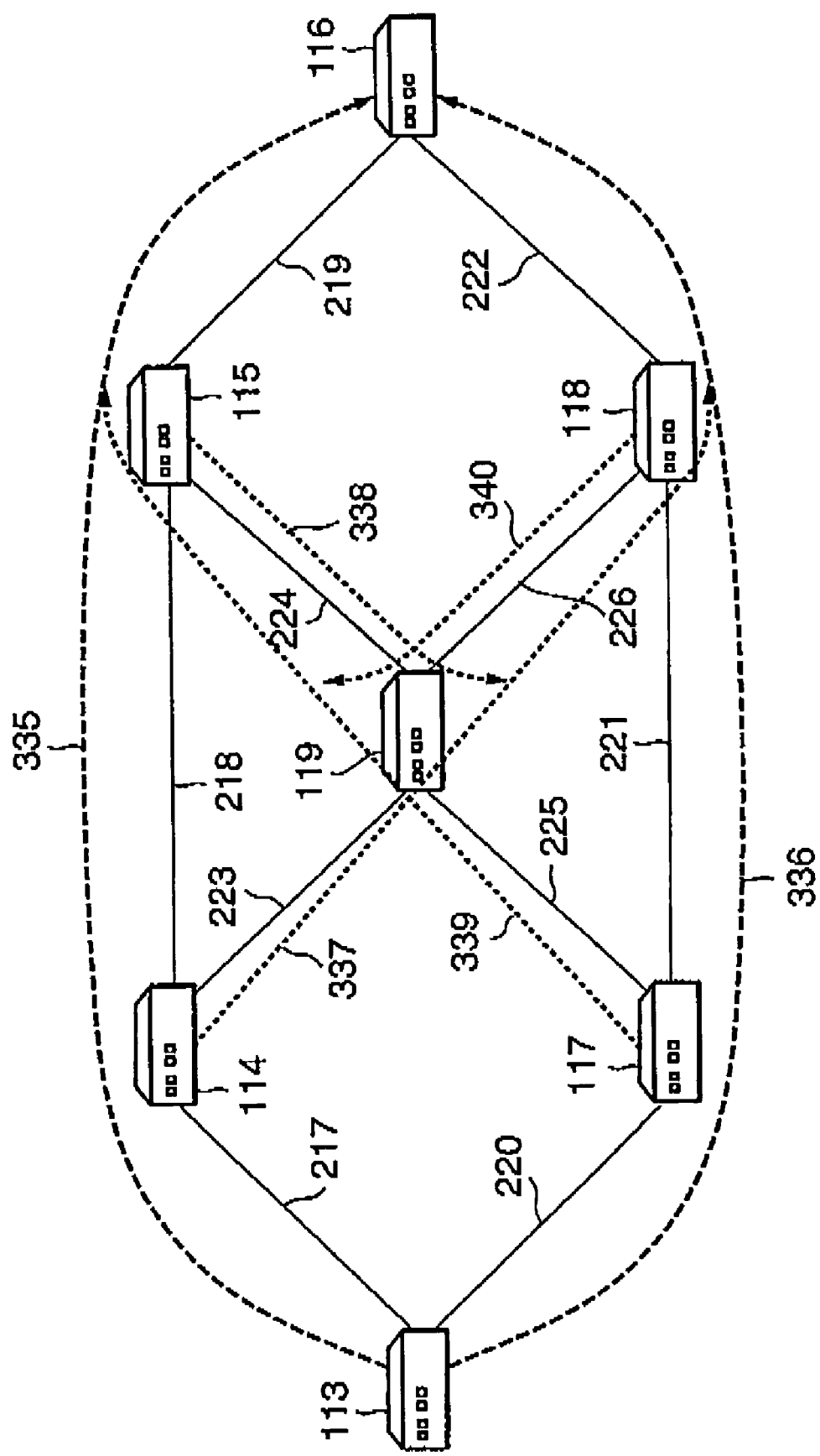
FIG. 20 is a schematic diagram illustrating backup LSPs to be established in the second embodiment of the present invention.

A second specific example in connection with the second embodiment of the present invention will be described with reference to FIG. 20. In FIG. 20, main LSPs 335 and 336 are established in the same network configuration as in FIG. 19. The main LSPs 335 and 336 are established for load balancing of traffic passing between the LSR 113 and the LSR 116, and are main LSPs belonging to the same peer group. In this case, a 5-Mbps band is reserved for both the LSPs 335 and 336. Backup LSPs are established for both the main LSPs 335 and 336.

When the LSR 113 serving as the ingress LSR receives both label mapping messages with respect to the setup of the main LSPs 335 and 336, the LSR 113 transmits a backup-LSP setup-request messages to the next-hop LSRs 114 and 117 on the corresponding main LSPs 335 and 336. The backup-LSP setup-request message transmitted to the LSR 114 serves to request the setup of the backup LSP for protecting the main LSP 335. On the other hand, the backup-LSP setup-request message transmitted to the LSR 117 serves to request the setup of the backup LSP for protecting the main LSP 336.

The setup of the backup LSP for protecting the main LSP 335 and the setup of the backup LSP for protecting the main LSP 336 are performed in an asynchronous manner. While a description will now be given of only the operation for establishing the backup LSP for protecting the main LSP 335, the operation for establishing the backup LSP for protecting the main LSP 336 is analogous thereto.

First, upon receiving a backup-LSP setup-request message, the LSR 114 calculates the route for the backup LSP that originates from the LSR 114. Conditions for the route for the backup LSP is that the route be calculated to be node-disjoint from the main LSP 335 in the segment from the LSR 114 to the LSR 116 and have the same 5-Mbps residual band as the reserved band of the main LSP 335. In this case, it is assumed that the route for the backup LSP is calculated to be the route through the LSRs 114→119→118→116.

Next, the LSR 114 transmits a label request message in the same manner as the process for setting up the backup LSP in the first specific embodiment, The label request message includes information concerning route information of the backup LSP to be established and the reserved band being 5 Mbps. The label request message is directed to be transferred in the order of the LSRs 119→118→116. However, at the time when the LSR 118 receives the label request message, the LSR 118 determines such that the merge is performed into the main LSP 336 belonging to the same peer group as the main LSP 335 to be protected. This determination is made based on merge condition (2) described in the second embodiment. In this case, the main LSP 336 needs to have a 5-Mbps reserved band required by the backup LSP to be established as well as a 5-Mbps reserved band for the main LSP 336. Thus, a 5-Mbps band that corresponds to the shortage in the segment from the LSR 118 to the LSR 116 on the main LSP 336 is additionally reserved. In this manner, since the merge condition is satisfied in terms of resources, merging is performed.

Upon the merge, the label request message is terminated at the LSR 118, and a label mapping message is transferred along the route in the reverse direction. Thus, a backup LSP 337 that merges into the main LSP 336 at the LSR 118 is established with the LSR 114 functioning as the starting node.

Upon receiving the label mapping message with respect to the LSP 337, the LSR 114 transmits a backup-LSP setup-request message to the LSR 115. Upon receiving the backup-LSP setup-request message, the LSR 115 calculates the route for the backup LSP that originates from the LSR 115. Conditions for the route for the backup LSP is that the route be calculated to be node-disjoint from the main LSP 335 in the segment from the LSR 115 to the LSR 116 and have the same 5-Mbps residual band as the reserved band of the main LSP 335. In this case, it is assumed that the route for the backup LSP is calculated to be the route through the LSRs 115→119→118→116.

Next, the LSR 115 transmits a label request message in the same manner as the processes at the LSR 114 for setting up the backup LSR The label request message is directed to be transferred In the order of the LSRs 119→118→116. However, at the time when the LSR 119 receives the label request message, the LSR 119 determines such that the merge is performed into the backup LSP 337 protecting the same main LSP 335 belonging to the same peer group. This determination for the merge is made based on merge condition (1) described in the second embodiment. The main LSP 337 needs to have a 5-Mbps reserved band or more required by the backup LSP to be established. In this case, since the condition is satisfied, the merge is executed without a need for an additional band reservation. In this manner, since the merge condition is satisfied in terms of resources, merging is performed.

Upon the merge, the label request message is terminated at the LSR 119, and a label mapping message is transferred along the route in the reverse direction. In this manner, a backup LSP 338 that merges into the LSP 337 at the LSR 119 is established with the LSR 115 functioning as the starting node.

Upon receiving the label mapping message with respect to the backup LSP 338, the LSR 115 transmits the backup-LSP setup-request message to the LSR 116.

Upon receiving the backup-LSP setup-request message, the LSR 116 transmits a backup-LSP setup-complete message to the LSR 113 since the LSR 116 is the egress LSR of the main LSP 335, On the other hand, with regard to the backup LSP for protecting the main LSP 336, a backup LSP 339 that merges into the main LSP 335 at the LSR 115 is established with the LSR 117 functioning as the starting node, and a backup LSP 340 that merges into the backup LSP 339 at the LSR 119 is established with the LSR 118 functioning as the starting node.

At the time when the LSR 113 receives backup-LSP setup-complete messages for both the main LSPs 335 and 336, the LSR 113 confirms that both backup LSPs protecting the LSPs 335 and 336 are set up.

According to the present invention, during the setup of a backup LSP for a main LSP, it is possible to reduce the amount of link resources involved in the setup of the backup LSP. This is because, when a backup LSP is established so as to merge into another pre-established backup LSP protecting the same main LSP, the merge is performed at an LSR that is located at the merge point.

In addition, according to the present invention, when a backup LSP is set up for each of a plurality of main LSPs for load balancing of traffic between two given nodes in a network, it is possible to reduce the amount of link resources involved in the setups of the backup LSPs. This is because, during the setup of a backup LSP, when a merge is possible into a pre-established backup LSP protecting one of the main LSPs, the merge is performed en route, and when a merge is possible into one of the main LSPs, the merge is performed en route in the same manner.

What is claimed is:

1. A communication connection bypass method for a connection-oriented network comprising a plurality of nodes that include an ingress node and an egress node, and a plurality of links that interconnect the plurality of nodes, a main communication connection being established in the connection-oriented network to connect the ingress node and the egress node, the main communication connection serving as a communication connection for transmitting data, wherein said method comprises the step of establishing at least one backup communication connection with at least one node excluding the egress node and functioning as a starting node when a failure occurs at one of the nodes or links on the main communication connection, such that a data transfer route is switched from the main communication connection to said at least one backup communication connection, wherein the route between the node functioning as the starting node for said at least one backup communication connection and the egress node is established such that the route does not include any of the links and nodes on the main communication connection.

wherein a plurality of the backup communication connections are established, and one of the backup communication connections merges into another one of the backup communication connections at a node en route.

2. A node for use in a connection-oriented network comprising a plurality of nodes that include an ingress node and an egress node, and a plurality of links that interconnect the plurality of nodes, a main communication connection being established in the connection-oriented network to connect the ingress node and the egress node, the main communication connection serving as a communication connection for transmitting data, wherein each of the nodes excluding the egress node comprises:
means for calculating a route that does not include any of the links and nodes on the main communication connection between the node and the egress node; and
means for establishing a backup communication connection on the calculated route for protecting the main communication connection,
wherein a plurality of the backup communication connections are established, and one of the backup communication connections merges into another one of the backup communication connections at a node en route.

3. A node according to claim 2, wherein the ingress node establishes the backup communication connection when the setup of the main communication connection is completed.

4. A node according to claim 2, wherein, when the setup of the backup communication connection is completed, the ingress node transmits a message requesting the setup of an additional backup communication connection to a next-hop node on the main communication connection.

5. A node according to claim 2, wherein, upon receiving a message requesting the setup of a backup communication connection from a previous-hop node on the main communication connection, each of the nodes excluding the ingress node and the egress node establishes the backup communication connection.

6. A node according to claim 5, wherein, when the setup of the backup communication connection is completed, each of the nodes excluding the ingress node and the egress node transmits a message requesting the setup of an additional backup communication connection to a next-hop node on the main communication connection.

7. A node according to claim 5, wherein, when the setup of the backup communication connection is completed, each of the nodes excluding the ingress node and the egress node transmits a message to the ingress node for notifying that the setup of the backup communication connection is completed.

8. A node according to claim 5, wherein, when the setup of the backup communication connection is completed, each of the nodes excluding the ingress node and the egress node determines whether or not the node is located at a hop directly before the egress node, and when the node is located at the hop directly before the egress node, said each of the nodes transmits a message to the ingress node for notifying that the setup of all backup communication connections for protecting the main communication connection is completed.

9. A node according to claim 2, wherein, upon receiving a message requesting the setup of a backup communication connection from a next-hop node on the main communication connection, each of the nodes excluding the ingress node and the egress node establishes the backup communication connection.

10. A node according to claim 9, wherein, when the setup of the backup communication connection is completed, each of the nodes excluding the ingress node and the egress node transmits a message requesting the setup of an additional backup communication connection to a previous-hop node on the main communication connection.

11. A node according to claim 2, wherein, upon receiving a message requesting the setup of a backup communication connection from a previous-hop node on the main communication connection, the egress node transmits to the ingress node a message for notifying that the setup of all backup communication connections for protecting the main communication connection is completed.

12. A server for use in a connection-oriented network comprising a plurality of nodes that include an ingress node and an egress node, a plurality of links that interconnect the plurality of nodes, and at least one server capable of communicating with the plurality of nodes, a main communication connection being established in the connection-oriented network to connect the ingress node and the egress node, the main communication connection serving as a communication connection for transmitting data,
wherein, when a failure occurs at one of the nodes or links on the main communication connection in the connection-oriented network, at least one backup communication connection is established with at least one node excluding the egress node and functioning as a starting node, and a data transfer route is switched from the main communication connection to said at least one backup communication connection,
said at least one server comprising calculation means for calculating the route between the node that functions as the starting node for said at least one backup communication connection and the egress node such that the route does not include any of the links and nodes on the main communication connection,
wherein a plurality of the backup communication connections are established, and one of the backup communication connections merges into another one of the backup communication connections at a node en route.

13. A server according to claim 12, further comprising communication means for communicating with the plurality of nodes, wherein, upon calculating the route, the calculation means transmits a message requesting the setup of said at least one backup communication connection to the plurality of nodes on the main communication connection via the communication means, the message including information concerning the calculated route.

14. A node excluding the egress node on the main communication connection, set forth in claim 13, the node further comprising means for establishing a backup communication connection for protecting the main communication connection on the route for the backup communication connection included in the message requesting the setup.

15. A node for use in a connection-oriented network comprising a plurality of nodes that include an ingress node and an egress node, and a plurality of links that interconnect the plurality of nodes, a main communication connection being established in the connection-oriented network to connect the ingress node and the egress node, the main communication connection serving as a communication connection for transmitting data,
wherein, upon receiving a message requesting binding of a connection identifier for a backup communication connection for protecting the main communication connections, each of the nodes excluding the egress node selects another communication connection as a communication connection into which a merge is to be performed at one of the nodes en route on a data transfer route, and merges the backup communication connection being established with respect to the message into the communication connection into which the merge is to be performed.

16. A node according to claim 15, wherein the communication connection into which the merge is to be performed is another backup communication connection for protecting the main communication connection.

17. A node according to claim 15, wherein a condition for the merge is that the communication connection into which the merge is to be performed has resources required by the backup communication connection being established, and wherein, when the communication connection into which the merge is to be performed does not have resources that satisfy the condition for the merge, the merge is performed after the resources are increased by an amount corresponding to the shortage in a segment downstream from a node at which the merge is to be performed.

18. A communication connection bypass method for a connection-oriented network comprising a plurality of nodes and a plurality of links interconnecting the plurality of nodes, wherein a plurality of main communication connections, each serving as a communication connection for transferring data, are established between two nodes in the connection-oriented network with one node being an ingress node and the other being an egress node, and the main communication connections do not share any of the links and nodes between the ingress node and the egress node with each other, said method comprising the step of establishing a backup communication connection for each main communication connection when a failure occurs at one of the nodes or links on the main communication connection, such that a data transfer route is switched from the main communication connection to the backup communication connection, wherein the backup communication connection is established with at least one node excluding the egress node and functioning as a starting node, and the route between the node functioning as the starting node for the backup communication connection and the egress node does not include any of the links and nodes on the main communication connection to be protected by the backup communication connection, and wherein the backup communication connection merges into another backup communication connection established for protecting one of the main communication connections or into one of the main communication connections excluding the main communication connection to be protected by the backup communication connection at a node en route on a data transfer route.

19. A node for use in a communication connection bypass method for a connection-oriented network comprising a plurality of nodes and a plurality of links interconnecting the plurality of nodes, wherein a plurality of main communication connections, each serving as a communication connection for transferring data, are established between two nodes in the connection-oriented network with one node being an ingress node and the other being an egress node, and the main communication connections do not share any of the links and nodes between the ingress node and the egress node with each other, and wherein, when the setup of the plurality of main communication connections is completed, the ingress node transmits a message requesting the setup of a backup communication connection to a next-hop node on each of the main communication connections.

20. A node for use in a connection-oriented network comprising a plurality of nodes and a plurality of links interconnecting the plurality of nodes, wherein a plurality of main communication connections, each serving as a communication connection for transferring data, are established between two nodes in the connection-oriented network with one node being an ingress node and the other being an egress node, and the main communication connections do not share any of the links and nodes between the ingress node and the egress node with each other, and wherein, upon receiving a message requesting binding of a connection identifier for a backup communication connection for protecting first one of the main communication connections, each of the nodes excluding the egress node selects another communication connection as a communication connection into which a merge is to be performed at a node en route on a data transfer route and merges the backup communication connection being established with respect to the message into the communication connection into which the merge is to be performed.

21. A node according to claim 20, wherein the communication connection into which the merge is to be performed is a second one of the main communication connections that is established so as to be node-disjoint from the first main communication between the ingress node and the egress node of the main communication connections.

22. A node according to claim 21, wherein, when the communication connection into which the merge Is to be performed is a second main communication connection established to be node-disjoint from the first main communication connection, a condition for the merge is that the second main communication connection has both resources required by the second main communication connection and resources required by the backup communication connection being established, and wherein, when the second main communication connection does not have resources that satisfy the condition for the merge, the merge is performed after the resources are increased by an amount corresponding to the shortage in a segment downstream from the node at which the merge is to be performed, on the second main communication connection.

23. A node according to claim 20, wherein the communication connection into which the merge is to be performed is either the other backup communication connection for protecting the main communication connection or the other backup communication connection, established so as to be node-disjoint from the first main communication connection, for protecting a second one of the main communication connections between the ingress node and the egress node of the main communication connections.

24. A node according to claim 20, wherein the communication connection into which the merge is to be performed is either a second one of the main communication connections that is established so as to be node disjoint from the first main communication connection between the ingress node and the egress node of the main communication connections or the other backup communication connection for protecting the first or second main communication connection.

25. A node according to claim 20, wherein the communication connection into which the merge is to be performed is selected on a condition that a transmission route of traffic flowing from the own node to the communication connection into which the merge is to be performed does not include any of the links of the first main communication connection or any of the nodes excluding the egress node.

26. A node according to claim 20, wherein a condition for the merge is that the communication connection into which the merge is to be performed has resources required by the backup communication connection being established, and wherein, when the communication connection into which the merge is to be performed does not have resources that satisfy the merge condition, the merge is performed after the resources are increased by an amount corresponding to the shortage in a segment, on the communication connection into which the merge is to be performed, downstream from the node at which the merge is to be performed.

27. A server for use in a connection-oriented network comprising a plurality of nodes, a plurality of links interconnecting the plurality of nodes, and at least one server capable of communicating with the plurality of nodes, wherein a plurality of main communication connections, each serving as a communication connection for transferring data, are established between two nodes in the connection-oriented network with one node being an ingress node and the other being an egress node, so as not to share any of the links and nodes between the ingress node and the egress node, and wherein, when a failure occurs at one of the nodes or links on the main communication connections, a backup communication connection is established for each of the main communication connections and a data transfer route is switched from the main communication connection to one of the backup communication connections, said at least one server comprising calculation means for calculating the route between the node that functions as a starting node for the backup communication connection and the egress node such that the route does not include any of the links and nodes on the main communication connection to be protected by the backup communication connection, wherein the backup communication connection merges into another backup communication connection established for protecting one of the main communication connections or into one of the main communication connections excluding the main communication connection to be protected by the backup communication connection at a node en route on a data transfer route.

28. A server according to claim 27, further comprising communication means for communicating with the plurality of nodes, wherein, upon calculating the route, the calculation means transmits a message requesting the setup of the backup communication connection to the starting node via the communication means, the message including information concerning the calculated route.

* * * * *